United States Patent
Arling et al.

(10) Patent No.: US 11,960,871 B2
(45) Date of Patent: Apr. 16, 2024

(54) SYSTEM AND METHOD FOR APP DISCOVERY, INSTALLATION, AND USAGE

(71) Applicant: Universal Electronics Inc., Scottsdale, AZ (US)

(72) Inventors: Paul D. Arling, Scottsdale, AZ (US); Arsham Hatambeiki, Scottsdale, AZ (US)

(73) Assignee: Universal Electronics Inc., Scottsdale, AZ (US)

( * ) Notice: Subject to any disclaimer, the term of this patent is extended or adjusted under 35 U.S.C. 154(b) by 20 days.

(21) Appl. No.: 17/406,667

(22) Filed: Aug. 19, 2021

(65) Prior Publication Data

US 2023/0059126 A1 Feb. 23, 2023

(51) Int. Cl.
| | |
|---|---|
| *G06F 9/445* | (2018.01) |
| *G06F 8/65* | (2018.01) |
| *H04L 9/40* | (2022.01) |
| *H04L 12/28* | (2006.01) |
| *H04L 65/60* | (2022.01) |
| *H04L 67/00* | (2022.01) |

(52) U.S. Cl.
CPC ............ *G06F 8/65* (2013.01); *H04L 12/2803* (2013.01); *H04L 63/083* (2013.01); *H04L 65/60* (2013.01); *H04L 67/34* (2013.01)

(58) Field of Classification Search
CPC ........................................................ G06F 8/65
USPC ........................................................ 717/172
See application file for complete search history.

(56) References Cited

U.S. PATENT DOCUMENTS

| | | | | |
|---|---|---|---|---|
| 7,814,524 | B2* | 10/2010 | Candelore | H04N 21/47 |
| | | | | 725/39 |
| 7,840,700 | B2* | 11/2010 | Raghavan | H04L 41/5009 |
| | | | | 709/238 |
| 8,850,524 | B2* | 9/2014 | Morris | G06F 21/31 |
| | | | | 713/168 |
| 9,098,678 | B2* | 8/2015 | Hao | H04L 9/3213 |
| 9,112,928 | B2* | 8/2015 | Lindberg | G06F 8/61 |
| 9,398,000 | B2* | 7/2016 | Grigg | H04L 63/126 |
| 10,735,792 | B2* | 8/2020 | Sandland | H04N 21/258 |
| 10,782,951 | B2* | 9/2020 | Ayers | G06F 21/45 |
| 2004/0193925 | A1* | 9/2004 | Safriel | G06F 21/31 |
| | | | | 726/6 |
| 2014/0130081 | A1 | 5/2014 | Ozawa | |
| 2014/0173643 | A1 | 6/2014 | Bhatia et al. | |
| 2014/0282657 | A1 | 9/2014 | Sinha et al. | |

(Continued)

FOREIGN PATENT DOCUMENTS

KR 20130099769 A * 2/2012

OTHER PUBLICATIONS

ISA/US, Int. Search Report and Written Opinion issued on PCT application No. PCT/US22/40215, dated Dec. 8, 2022, 10 pages.

*Primary Examiner* — Evral E Bodden

(74) *Attorney, Agent, or Firm* — Greenberg Traurig, LLP

(57) ABSTRACT

A system and method functions to make an app as installed on a smart device usable to access a service, such as a media streaming service. A presence of a counterpart to the app as installed on an appliance within a home network which includes the smart device is detected. A user credential, such as a username and password combination, that is associated with the counterpart to the app is then identified. The user credential is caused to be automatically associated with the app as installed on the smart device.

19 Claims, 24 Drawing Sheets

(56) References Cited

U.S. PATENT DOCUMENTS

| | | | |
|---|---|---|---|
| 2019/0208244 A1 | 7/2019 | Choi et al. | |
| 2019/0238626 A1* | 8/2019 | Arling | H04L 67/10 |
| 2020/0204613 A1 | 6/2020 | Hatambeiki et al. | |
| 2021/0248338 A1* | 8/2021 | Spivack | G06K 7/10831 |

* cited by examiner

| Function | Appliance | | | | | |
|---|---|---|---|---|---|---|
| | TV | AVR | STB/DVR | DVD | CD | Etc..... |
| Power on | CEC | CEC | CEC | CEC | IR | |
| Power off | CEC | CEC | CEC | CEC | IR | |
| Volume up | IR | CEC | n/a | n/a | n/a | |
| Volume down | IR | CEC | n/a | n/a | n/a | |
| Mute | IR | CEC | n/a | n/a | n/a | |
| Play | n/a | n/a | CEC | CEC | IR | |
| Pause | n/a | n/a | CEC | CEC | IR | |
| FF | n/a | n/a | CEC | CEC | IR | |
| Rew | n/a | n/a | CEC | CEC | IR | |
| Sound field A | CEC | IP | IP | n/a | n/a | |
| Sound field B | CEC | IP | IP | n/a | n/a | |
| Input 1 | CEC | IR | n/a | n/a | n/a | |
| Input 2 | CEC | IR | n/a | n/a | n/a | |
| Etc..... | | | | | | |

Activity = "Listen to music"
Activity = "Watch a movie"

Activity= "watch TV"

| | Appliance | TV | STB/DVR | DVD | AVR |
|---|---|---|---|---|---|
| State | Power | On | On | On | On |
| | Input | HDMI1 | --- | --- | S/PDIF2 |
| | | | | | |
| Function | Volume | Off | --- | --- | Active |
| | Transport | --- | Active | Off | --- |

FIG. 12

| | Current appliance state | | | | |
|---|---|---|---|---|---|
| | Appliance | TV | STB/DVR | DVD | AVR |
| State | Power | On | Off | On | ?? |
| | Input | HDMI2 | --- | --- | ?? |
| | | | | | |

SYSTEM AND METHOD FOR APP DISCOVERY, INSTALLATION, AND USAGE

BACKGROUND

US Publication No. 2020/0204613, the disclosure of which is incorporated herein by reference in its entirety, describes systems and methods for enabling voice interaction with appliances, services (e.g., media streaming services, gaming services, news feed services, social platform services, etc.), and the like by way of appropriate supplied apps. The apps may be presented or downloaded to a smart device having associated therewith one or more cloud-based, voice service platforms. An agent program resident in the smart device may periodically scan a local, i.e., home, network environment (e.g., a wired and/or wireless network), listen for the utterance of keywords, etc., for the purpose of detecting the presence of one or more cloud-based voice service platforms, appliances, services, or the like. The scanning/listening may be performed either automatically or at user request. When the presence of such a cloud-based voice service platform, appliance, service, etc. is detected, the setup agent may initiate a download (and sometimes automatic installation) of an appropriate app for the detected cloud-based voice service platform, appliance, service, or the like. In those cases where a suitable app is found to be already included in the system, the setup agent may initiate any actions necessary to install or enable the app and, furthermore, may function to synchronize the app, after installation, with the detected cloud-based, voice service platform, appliance, or service. Such actions may include, for example, status download and update, transfer of user authentications, etc. The setup agent may also make use of a cloud-based service or services to determine if an app is available for a newly detected appliance, service, etc. and, if necessary, to coordinate, authentication and synchronization of the app with the voice enabled platform and/or across all smart devices, devices, services, etc. that are currently present in an environment as desired.

SUMMARY

The following relates generally to systems and methods for app discovery, installation, and usage. More particularly, systems and methods are described that will function to make an app as installed on a smart device usable to access a service, such as a media streaming service. A presence of a counterpart to the app as installed on an appliance within a home network which includes the smart device is detected. A user credential, such as a username and password combination, that is associated with the counterpart to the app is then identified. The user credential is then caused to be automatically associated with the app as installed on the smart device. In this manner, the user credential will be verifiable by the service upon a subsequent usage of app to thereby provide access to the service without requiring additional user interaction with the system.

A better understanding of the objects, advantages, features, properties, and relationships of the subject systems and methods will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the systems and method described hereinafter, reference may be had to preferred embodiments shown in the attached drawings in which:

FIG. 7 illustrates an example preferred command matrix for use in a control environment, for example, as illustrated in FIG. 6;

FIG. 11 illustrates example activity configuration matrices such as may be defined during the steps of FIG. 10;

FIG. 12 illustrates an example current appliance state matrix which may be maintained by a data repository associated with a controlling device for use in determining the commands necessary to invoke one of the states defined by the matrix of FIG. 11;

DETAILED DESCRIPTION

Figure 1:
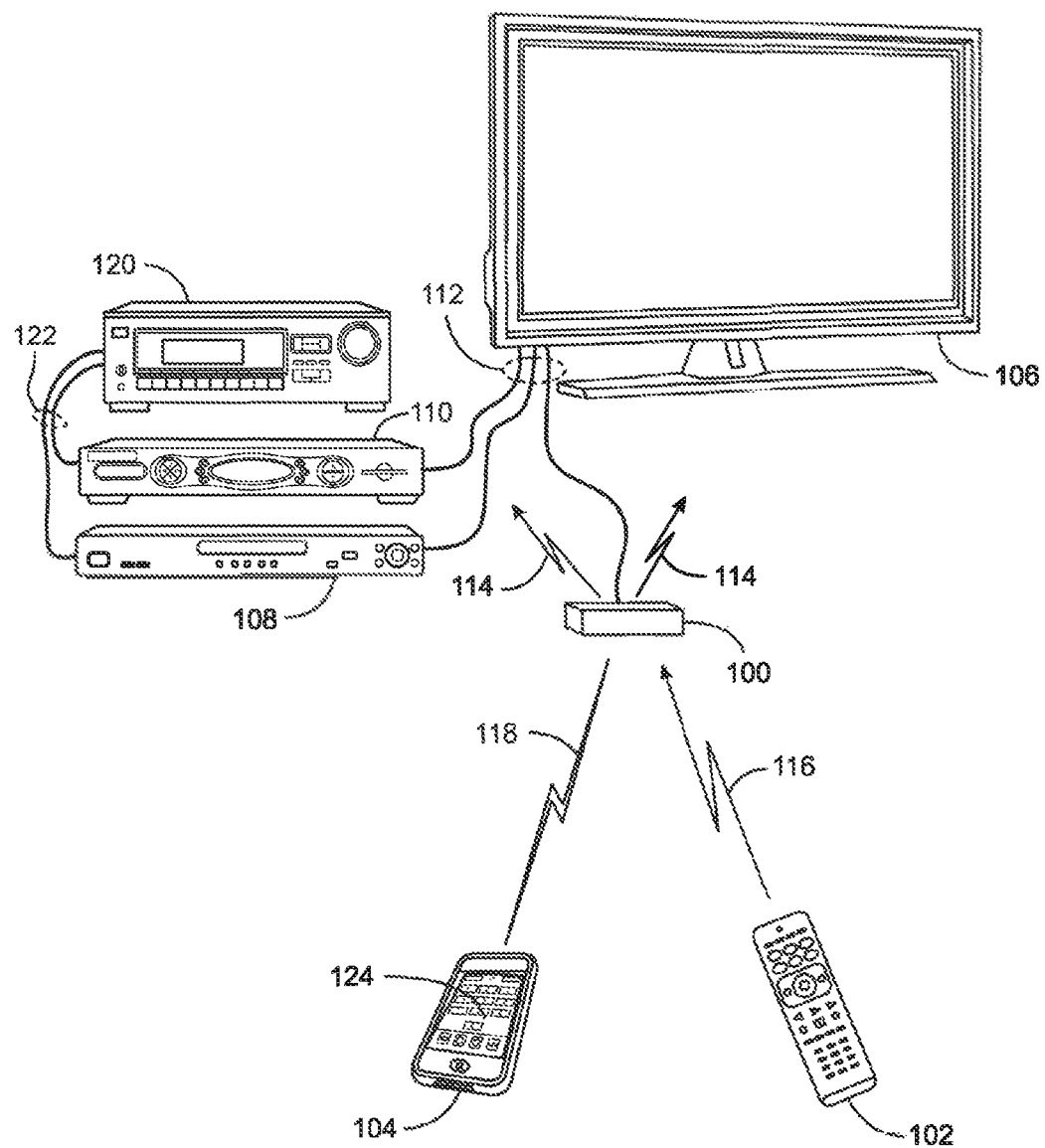
FIGS. 1 and 2 illustrate example systems in which a standalone device may be utilized to control operation of several appliances.

With reference to FIG. 1, there is illustrated an example system in which a device 100 (which, in some examples, is capable of supporting one or more cloud-based, voice service platforms for the purpose of making the device 100 voice service enabled) may be used to at least issue commands to control various controllable appliances, such as a television 106, a cable set top box combined with a digital video recorder ("STB/DVR") 110, a DVD player 108, and an AV receiver 120. While illustrated in the context of a television 106, STB/DVR 110, a DVD player 108, and an AV receiver 120, it is to be understood that controllable appliances may include, but need not be limited to, televisions, VCRs, DVRs, DVD players, cable or satellite converter set-top boxes ("STBs"), amplifiers, CD players, game consoles, media streaming devices, home lighting, drapery, fans, HVAC systems, thermostats, personal computers, etc.

Within the illustrated system, the controlling device and the controllable devices may be adapted to support one or more apps. For example, the controllable devices may support apps for accessing media from a media content supplier, such as "ESPN," "DISNEY+," "HULU," "NETFLIX," etc. Similarly, the devices may have an associated app, also referred to herein as a "skill," "action," or the like, that functions to provide a cloud-based voice service platform enabled device with an ability to communicate with other devices, websites, services, and the like as desired and/or required.

In the example of FIG. 1, appliance commands may be caused to be issued by device 100, when appropriately configured, in response to infrared ("IR") request signals 116 received from a remote control device 102, radio frequency ("RF") request signals 118 received from an app 124 resident on a smart device 104 or any other device from which device 100 may be adapted to receive requests, using any appropriate communication method. In addition, the device 100, when appropriately configured, will respond to voice communications received via use of, for example, one or more microphones provided to device 100. As illustrated, requested transmission of any commands from the device 100 to appliances 106,108,112,120 may take the form of wireless IR signals 114, CEC commands issued over a wired "HDMI" interface 112, RF signals such as contemplated by "RF4CE," "ZWAVE," and "BLUETOOTH," etc. as appropriate to the capabilities of the particular appliance to which each command may be directed. For example, in the system illustrated, AV receiver 120 may not support "HDMI" inputs, being connected to audio source appliances 108,110 via S/PDIF interfaces 122. Accordingly, device 100 may be constrained to transmit all commands destined for AV receiver 120 exclusively as IR signals, while commands destined for the other appliances 106 through 110 may take the form of either CEC, RF, or IR signals as appropriate for each command. By way of example without limitation, certain TV manufacturers may elect not to support volume adjustment via CEC. If the illustrative TV 106 is of such manufacture, device 100 may relay volume adjustment requests to TV 106 as IR signals 114, while other requests such as power on/off or input selections may be relayed in the form of CEC commands over "HDMI" connection 112. Transmissions to and from devices may therefore take the form of any convenient IR, RF, hardwired, point-to-point, or networked protocol, as necessary for a particular embodiment. Further, while wireless communications 116, 118, etc., between example devices are illustrated herein as direct links, it is to be appreciated that in some instances such communication may take place via a local area network or personal area network, and as such may involve various intermediary devices such as routers, bridges, access points, etc. Since these items are not necessary for an understanding of the subject disclosure, they are omitted from this and subsequent Figures for the sake of clarity.

Since smart device, remote control apps such as that contemplated in the illustrative device 104 are well known in the art, the operation, features, and functions thereof will not be described in detail herein for the sake of brevity. Nevertheless, if a more complete understanding of the nature of such apps is desired, the interested reader may turn to, for example, U.S. Pat. Nos. 9,503,562 or 8,243,207.

Figure 2:
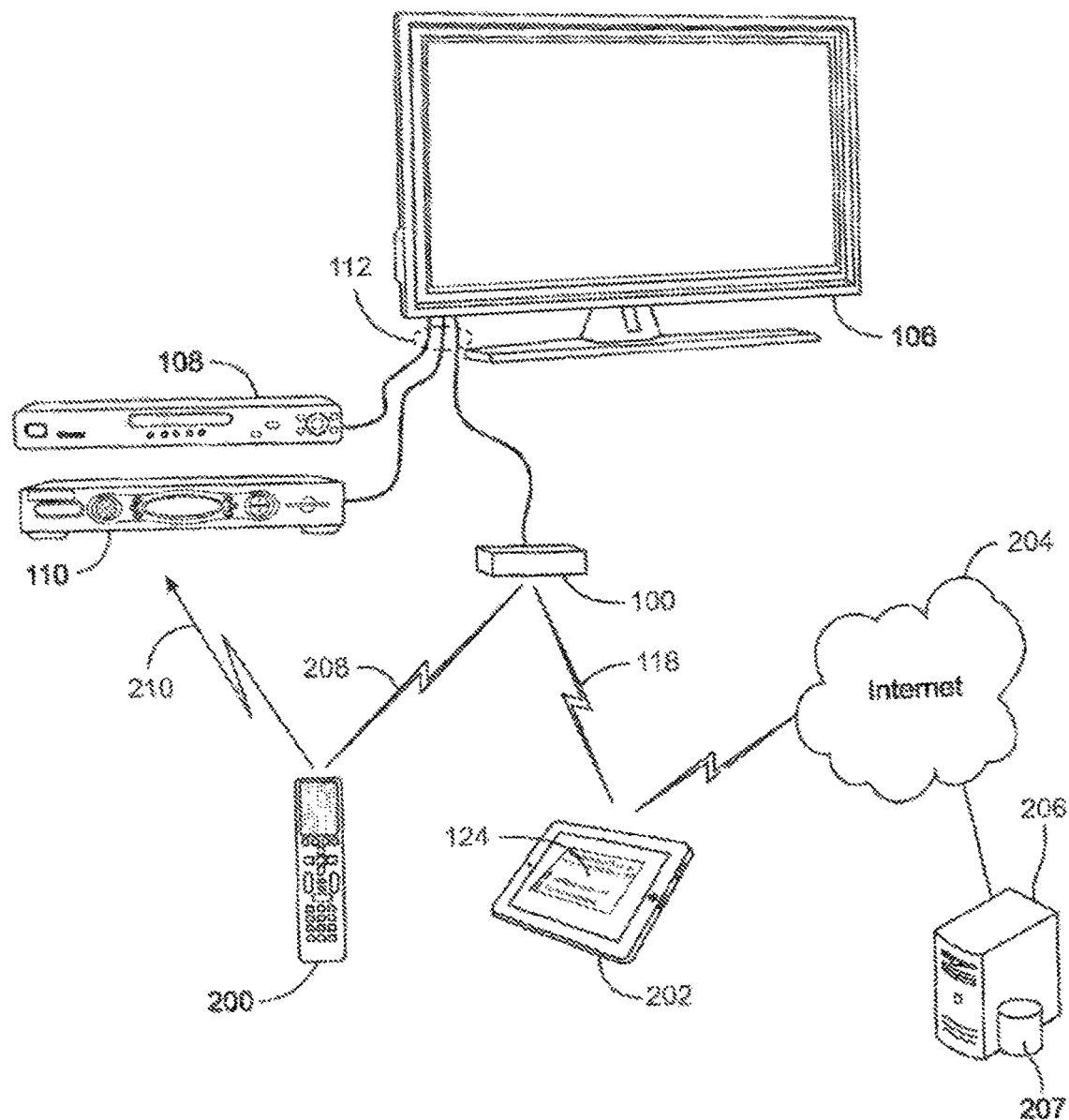

Turning now to FIG. 2, in a further illustrative embodiment, device 100 may receive wireless request signals from a remote control 200 and/or an app resident on a tablet computer 202. As before, command transmissions to appliances 106,108,110 may take the form of wired CEC commands or wireless RF or IR commands. However, in this example remote control 200 may be in bi-directional communication 208 with device 100 and accordingly the device 100 may delegate the transmission of certain commands, such as IR commands 210, to the remote control device 200 or to yet another device adapted to provide command signaling, e.g., use remote control 200 as a relay device for those commands determined to be best executed via IR transmissions. As also generally illustrated in FIG. 2, a setup app 124 executing on a smart device, such as tablet computer 202, may be utilized in conjunction with an Internet (212,204) accessible or cloud-based server 206 and associated database 207 to initially configure device 100 for operation with the specific group of appliances to be controlled, e.g., to communicate to device 100 a matching command code set and capability profile for each particular appliance to be controlled, for example based on type, manufacture, model number, etc., to identify apps installed on one or more devices within the system, to cause one or more related apps to be installed on another device within the system, to synchronize apps, and/or invoke apps as will be described in greater detail hereafter.

Figure 3:
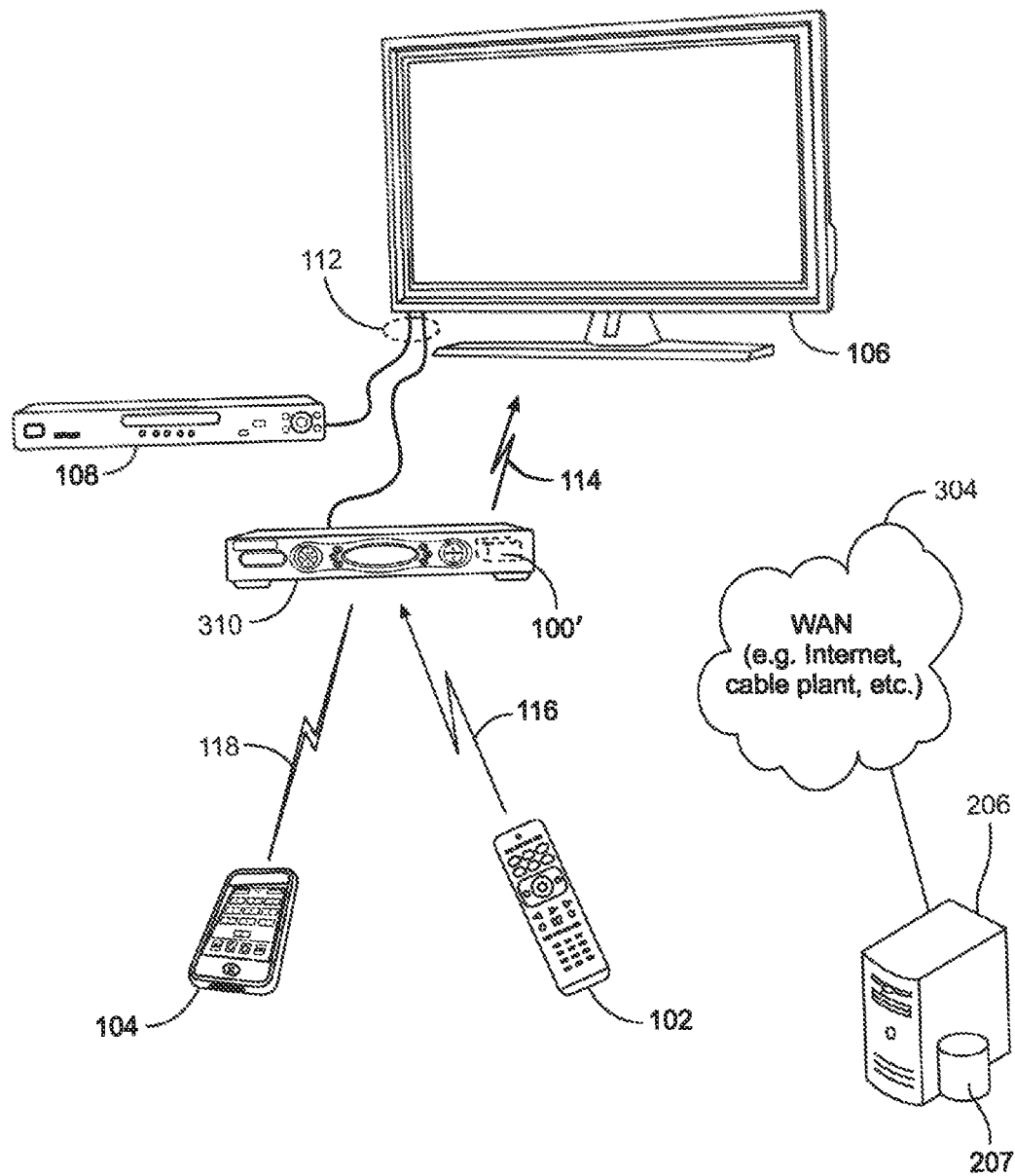
FIGS. 3 and 4 illustrate example systems in which control functionality may be incorporated into an appliance which is part of a home entertainment system.

With reference to FIG. 3, in a further illustrative embodiment a device and/or module having control functionality 100' may be embedded in an appliance, for example STB/DVR 310. In this example, remote control 102 and/or smart device 104 may transmit wireless request signals directly to STB/DVR 310 for action by the built-in device 100', which actions may, as before, comprise CEC command transmissions via "HDMI" connection 112 or wireless RF or IR command transmissions 114, originating in this instance from an appropriate RF transmitter or IR blaster provisioned to the STB/DVR appliance 310. In this configuration, a setup application resident in STB/DVR 310 may be utilized to configure device 100', using for example an Internet connection 304 accessible through a cable modem and/or cable distribution system headend.

Figure 4:
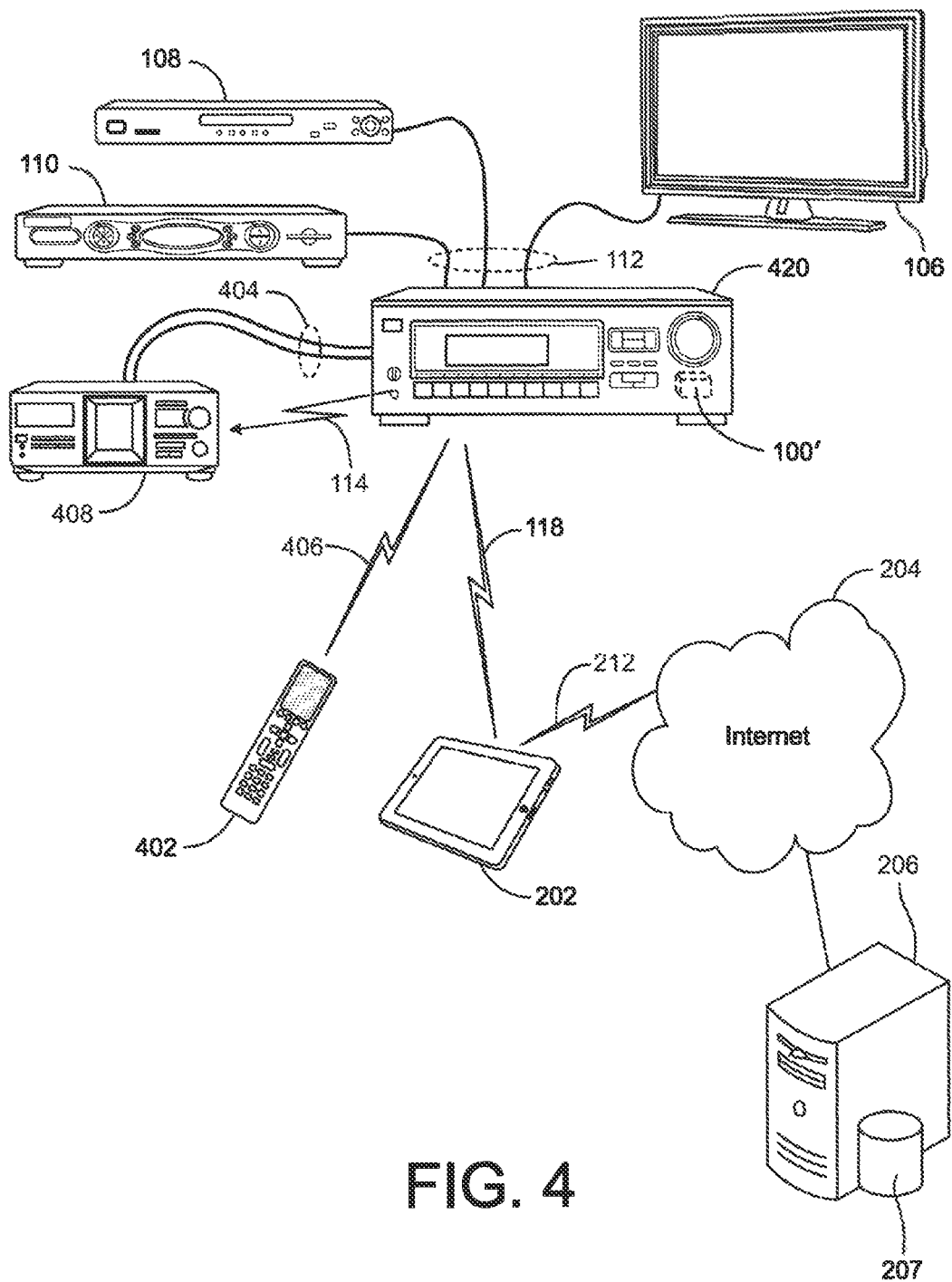

In the further illustrative embodiment of FIG. 4, a device having control functionality 100' may be embedded in an AV receiver 420 which may serve as an "HDMI" switch between various content sources such as a STB/DVR 110 or a DVD player 108 and a rendering device such as TV 106. In addition to "HDMI" inputs, AV receiver 420 may also support various other input formats, for example analog inputs such as the illustrative input 404 from CD player 408; composite or component video; S/PDIF coaxial or fiberoptic; etc. In this embodiment, request signals 406, voice commands, etc., may be directed to AV receiver 420, for example from remote control 402, for action by device 100'. As before, resulting appliance commands may be transmitted using CEC signals transmitted over "HDMI" connections 112, RF, or via IR signals 114 transmitted from an associated IR blaster. As appropriate for a particular embodiment, initial configuration of device 100' to match the equipment to be controlled may be performed by an Internet-connected app resident in AV receiver 420, or by an app resident in tablet computer 202 or other smart device, as mentioned previously in conjunction with FIG. 2.

As will be appreciated, various other configurations are also possible without departing from the underlying controlling device concept described herein, for example, device 100' may be incorporated into an Internet-capable TV, an "HDMI" switch, a game console, etc.; appliance command set and capability database 207 may be located at an internet cloud or a cable system headend, may be stored locally (in all or in part), which local storage may take the form of internal memory within the device 100' itself or in an appliance such as a TV, STB or AV receiver, or may take the form of a memory stick or the like attachable to a smart device or appliance; etc.

Figure 5:
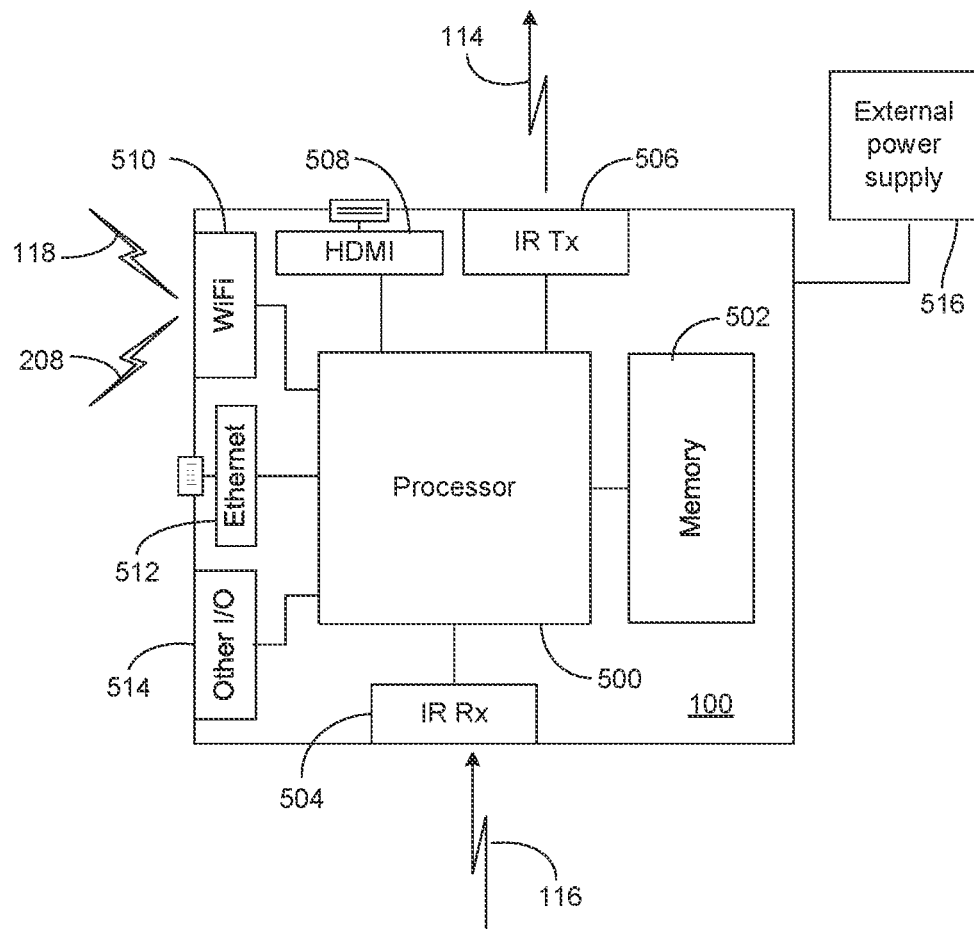
FIG. 5 illustrates a block diagram of an example controlling device.

With reference to FIG. 5, an example device 100 (whether stand alone or in an appliance supporting functionality embodied as a device 100') may include, as needed for a particular application, a processor 500 coupled to a memory 502 which memory may comprise a combination of ROM memory, RAM memory, and/or non-volatile read/write memory and may take the form of a chip, a hard disk, a magnetic disk, an optical disk, a memory stick, etc., or any combination thereof. It will also be appreciated that some or all of the illustrated memory may be physically incorporated within the same IC chip as the processor 500 (a so called "microcontroller") and, as such, it is shown separately in FIG. 5 only for the sake of clarity. Interface hardware provisioned as part of the example device 100 platform may include IR receiver circuitry 504 and IR transmitter circuitry 506; one or more microphones; an "HDMI" interface 508; one or more RF, e.g., WiFi, transceivers and interfaces 510; an Ethernet interface 512; and any other wired or wireless I/O interface(s) 514 as appropriate for a particular embodiment, by way of example without limitation "BLUETOOTH," "RF4CE," "USB," "ZIGBEE," "ZENSYS," "X10/INSTEON," "HOMEPLUG," "HOMEPNA," etc. In some instances, the electronic components comprising the example device 100 platform may be powered by an external power source 516. In the case of a standalone device 100 such as illustrated in FIG. 1 or 2, this may comprise for example a compact AC adapter "wall wart," while integrated devices 100' such as illustrated in FIG. 3 or 4 may draw operating power from the appliance into which they are integrated. It will also be appreciated that in the latter case, in certain embodiments processor 500 and/or memory 502 and/or certain portions of interface hardware items 504 through 514 may be shared with other functionalities of the host appliance.

As will be understood by those skilled in the art, some or all of the memory 502 may include executable instructions that are intended to be executed by the processor 500 to control the operation of the device 100 (collectively, the device programming) as well as data which serves to define the necessary control protocols and command values (also referred to as "key codes") for use in transmitting command signals to controllable appliances (collectively, the command data). In this manner, the processor 500 may be programmed to control the various electronic components within the example device 100, e.g., to monitor the communication means 504, 510 for incoming request messages from controlling devices, to monitor the microphones for sound signals, to cause the transmission of appliance command signals, etc.

To cause the device 100 to perform an action, the device 100 may be adapted to be responsive to events, such as a received voice signal, a received request message from remote control 102 or smart device 104, changes in connected appliance status reported over "HDMI" interface 508, "WIFI" interface 510, or "ETHERNET" interface 512, etc. In response to an event, appropriate instructions within the device programming may be executed. For example, when a command request is received via a microphone, from a smart phone 104, or the like, the device 100 may retrieve from the command data stored in memory 502 a preferred command transmission medium (e.g., IR, "RF4CE", CEC over "HDMI," IP over "WIFI,", etc.) and a corresponding command value and control protocol to be used in transmitting that command to an intended target appliance, e.g., TV 106, in a format recognizable by that appliance to thereby control one or more functional operations of that appliance. By way of further example, the status of connected appliances and status of a supported app as needed, e.g., powered or not powered, currently selected input, playing or paused, etc., as may be discerned from interfaces 508 through 514, may be monitored and/or tabulated by the device programming in order to facilitate adjustment of appliance settings to match user-defined activity profiles, e.g. "Watch TV", "View a movie", etc., to synchronize app states, and the like. It will be appreciated that the states, command values, protocols to use, etc. may also or alternatively be obtained from a cloud-computing service as needed or as required.

Figure 6:
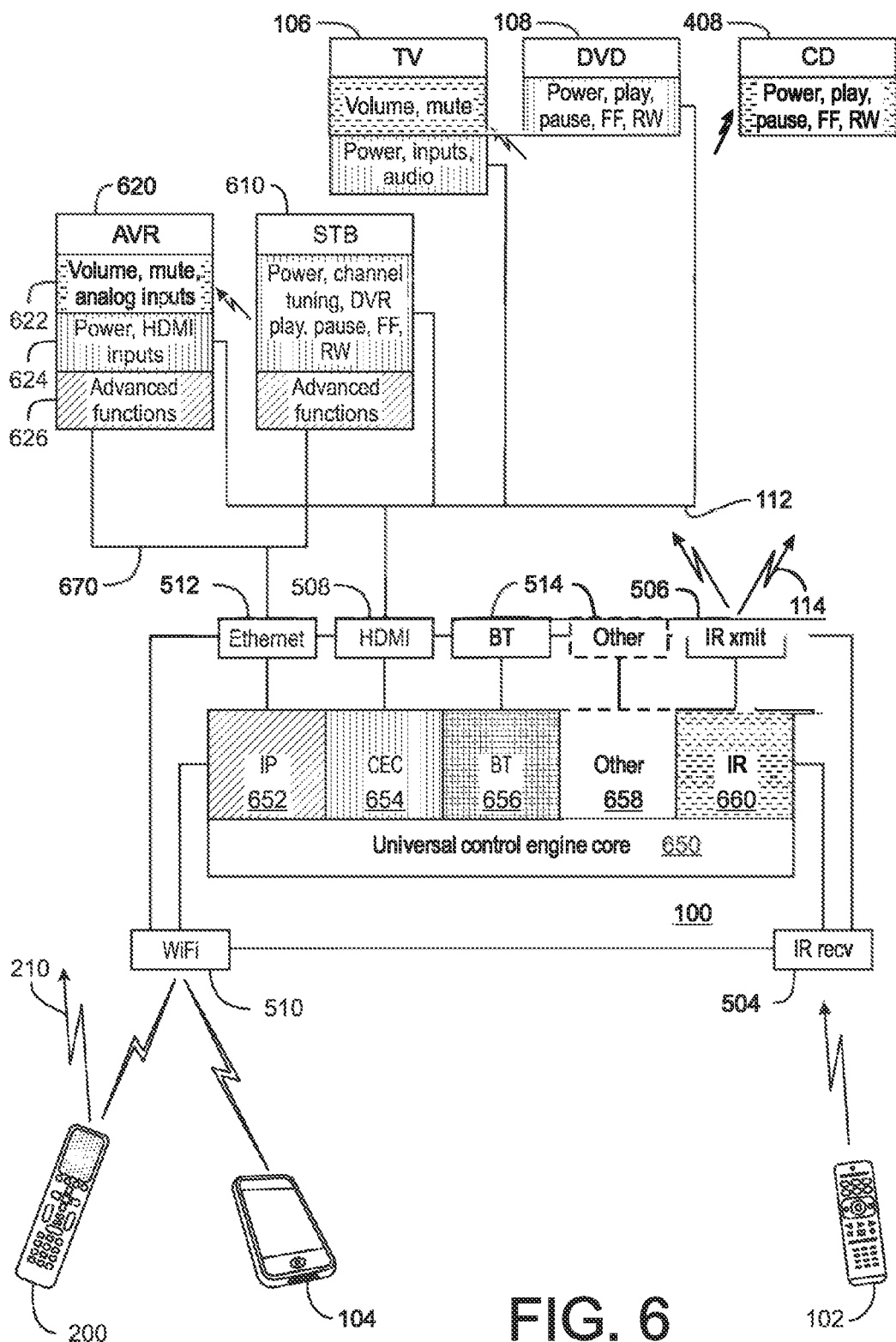
FIG. 6 illustrates a graphical representation of an example control environment.

An overview of an example control environment utilizing a device 100 is presented in FIG. 6. The programming of the example device 100 may comprise a universal control engine core 650 together with a series of scalable software modules 652 through 660, including apps or "skills" having command and control capabilities. Each module may, as appropriate, support a particular appliance command protocol or method and may be provisioned as appropriate for a particular embodiment. By way of example, the illustrative embodiment of FIG. 6 may include an internet protocol (IP) module 652, a CEC over "HDMI" module 654, a "BLUETOOTH" module 656, an IR module 660, and other modules(s) 658, e.g., an RF module, as appropriate for the particular application. The appliances to be controlled may include an IP enabled AV receiver 620, an IP enabled STB/DVR 610, TV 106, DVD player 108, and CD player 408. Certain of these devices may be interconnected via "HDMI" 112 and/or Ethernet 670 interfaces. It is to be noted that the illustrative interconnections 112 and 670 of FIG. 6 are intended to depict logical topography only and, accordingly, details of exact physical cabling structure and/or the presence of any necessary switches, routers, hubs, repeaters, interconnections, etc., are omitted for the sake of clarity.

The preferred method/protocol/medium for issuance of commands to the example appliances of FIG. 6 may vary by both appliance and by the function to be performed. By way of example, volume control and analog input selection commands 622 targeted to AV receiver 620 may be required to be issued via IR transmissions, power on/off and "HDMI" input selection functionality commands 624 may be better communicated via CEC commands, and advanced functionality commands 626, such as sound field configuration, may be best communicated via an Ethernet connection. In a similar manner, the various operational functions of the other appliances may be best commanded via a mixture of mediums, methods, and protocols, as illustrated. As will be appreciated, in some instances a particular appliance may support receipt of an operational command via more than one path, for example the power on/off function of AV receiver 620 may be available not only as a CEC command, but also via an IR command. In such instances, the preferred command format may be that which has been determined to offer the greatest reliability, for example, in the above instance the CEC command may be preferred since this form of command is not dependent on line-of-sight and also permits confirmation that the action has been performed by the target appliance.

In order to determine the optimum method for each configured appliance type and command, the example device core program 650 may be provisioned with a preferred command matrix 700, as illustrated in FIG. 7. Example preferred command matrix 700 may comprise a series of data cells or elements, e.g. cells 712, each corresponding to a specific command 702 and a specific one of the appliances to be controlled 704. The data content of such a cell or element may comprise identification of a form of command/transmission to be used and a pointer to the required data value and formatting information for the specific command. By way of example, the data element 712 corresponding to the "Input 2" command 706 for the configured TV appliance 708, may comprise an indicator that a CEC command is to be used, i.e., an indicator of the transmission device that is to be used to communicate the command to the intended target appliance, together with a pointer to the appropriate command data value and HDMI-CEC bus address; while data element 714 corresponding to the same command function for the configured AV receiver 710 may comprise an indicator that an IR command is to be used, together with a pointer to appropriate command data and formatting information within an IR code library stored elsewhere in memory 502. In certain embodiments one or more secondary command matrices 716 may also be provisioned, allowing for the use of alternate command methods in the event it is determined by the device programming that a preferred command was unsuccessful. Command matrix 700 may also contain null entries, for example 718, where a particular function is not available on or not supported by a specific appliance. In an example embodiment, command matrix 700 may be created and loaded into the memory 502 of the device 100 during an initialization and set-up process, as will now be described in further detail.

In order to perform initial configuration of device 100, a setup application may be provided. In some embodiments, such a setup application may take the form of programming to be executed on any convenient device with a suitable user interface and capable of establishing communication with the device 100, such as without limitation a smart phone, tablet computer, personal computer, set top box, TV, etc., as appropriate for a particular embodiment. In other embodiments such a setup application may be incorporated into the device programming itself, utilizing for example a connected TV screen, smart device screen, etc. and an associated controlling device (which may include the smart device, a cloud-based voice service platform device, etc.) having input capabilities, e.g., keys, microphone(s), etc., for use as the user interface. Regardless of the exact form and location of the programming and user interface means, the series of steps which may be performed by a setup application when configuring the device 100 for operation with a specific set of appliances remains similar. Accordingly, it will be appreciated that the methods comprising the illustrative setup application presented below in conjunction with FIGS. 8 and 9 may be generally applied, mutatis mutandis, to various alternative setup application embodiments.

Figure 8:
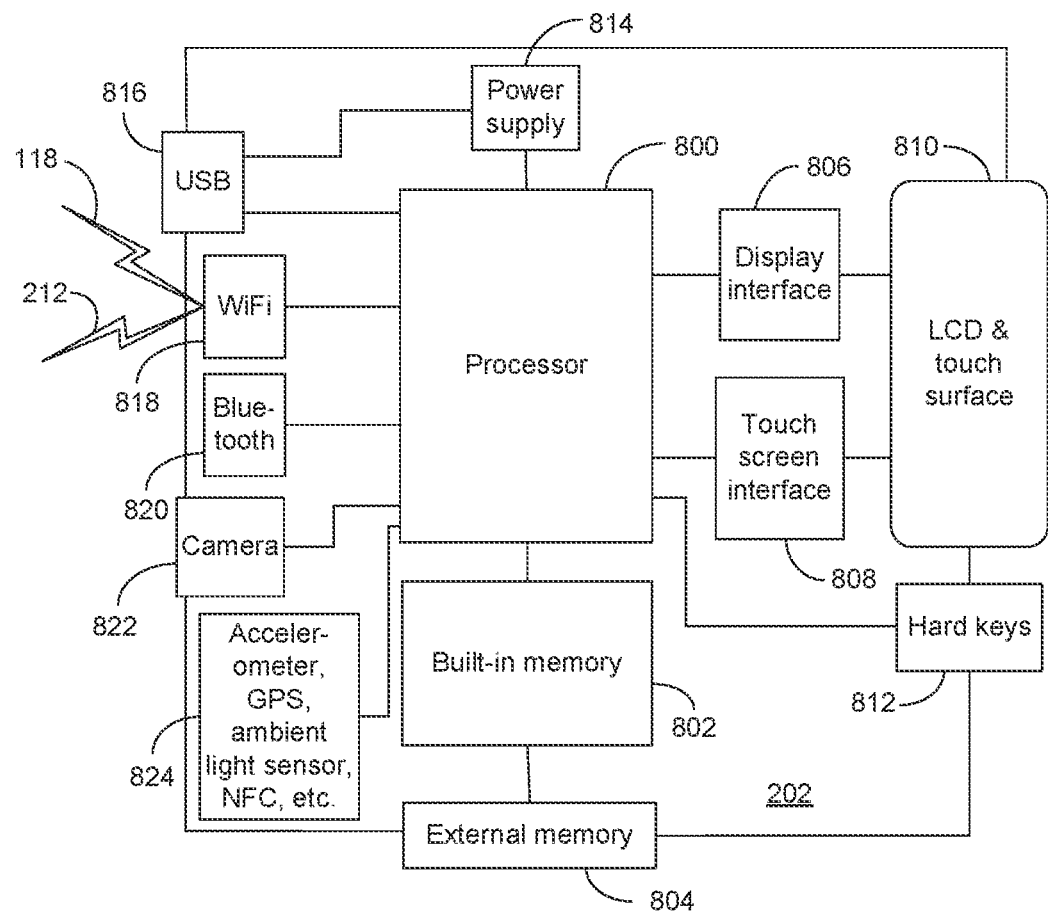
FIG. 8 illustrates a block diagram of an example smart device which may support a remote control app and a setup method for use in configuring the smart device as a controlling device.

With reference to FIG. 8, as known in the art a tablet computer such as the example device 202 of FIG. 2 may comprise, as needed for a particular application, a processor 800 memory 802 which memory may comprise a combination of ROM memory, RAM memory, and/or non-volatile read/write memory and may take the form of a chip, a hard disk, a magnetic disk, an optical disk, a memory stick, etc., or any combination thereof. In some embodiments, provision may also be made for attachment of external memory 804 which may take the form of an SD card, memory stick, or the like. Hardware provisioned as part of an example tablet computer platform may include a microphone, an LCD touchscreen 810 with associated display driver 806 and touch interface 808; hard keys 812 such as for example a power on/off key; a USB port 816; "WIFI" transceiver and interface 818; a "BLUETOOTH" transceiver and interface 820; a camera 822; and various other features 824 as appropriate for a particular embodiment, for example an accelerometer, GPS, ambient light sensor, near field communicator; etc. The electronic components comprising the example tablet computer device 202 may be powered by a battery-based internal power source 814, rechargeable for example via USB interface 816.

Memory 802 may include executable instructions that are intended to be executed by the processor 800 to control the operation of the tablet computer device 202 and to implement various functionalities such as Web browsing, game playing, video streaming, etc. As is known in the art, programming comprising additional functionalities (referred to as "apps") may be downloaded into tablet computer 202 via, for example, "WIFI" interface 818, "USB" 816, external memory 804, or any other convenient method. As discussed previously, one such app may comprise a control app, for example as that described in U.S. Pat. No. 8,918,719 of like assignee and incorporated herein by reference in its entirety, which app may be for use in commanding the operation of appliances 106, 108, 110 and/or 120 via device 100 and/or for otherwise enabling the device 202 to communicate with device 100. In order to initially configure device 100 to match the appliances to be controlled and to establish an appropriate command matrix, tablet computer 202 may also be provisioned with a setup app 214, either as part of a control app or as separately downloadable app.

Figure 9:
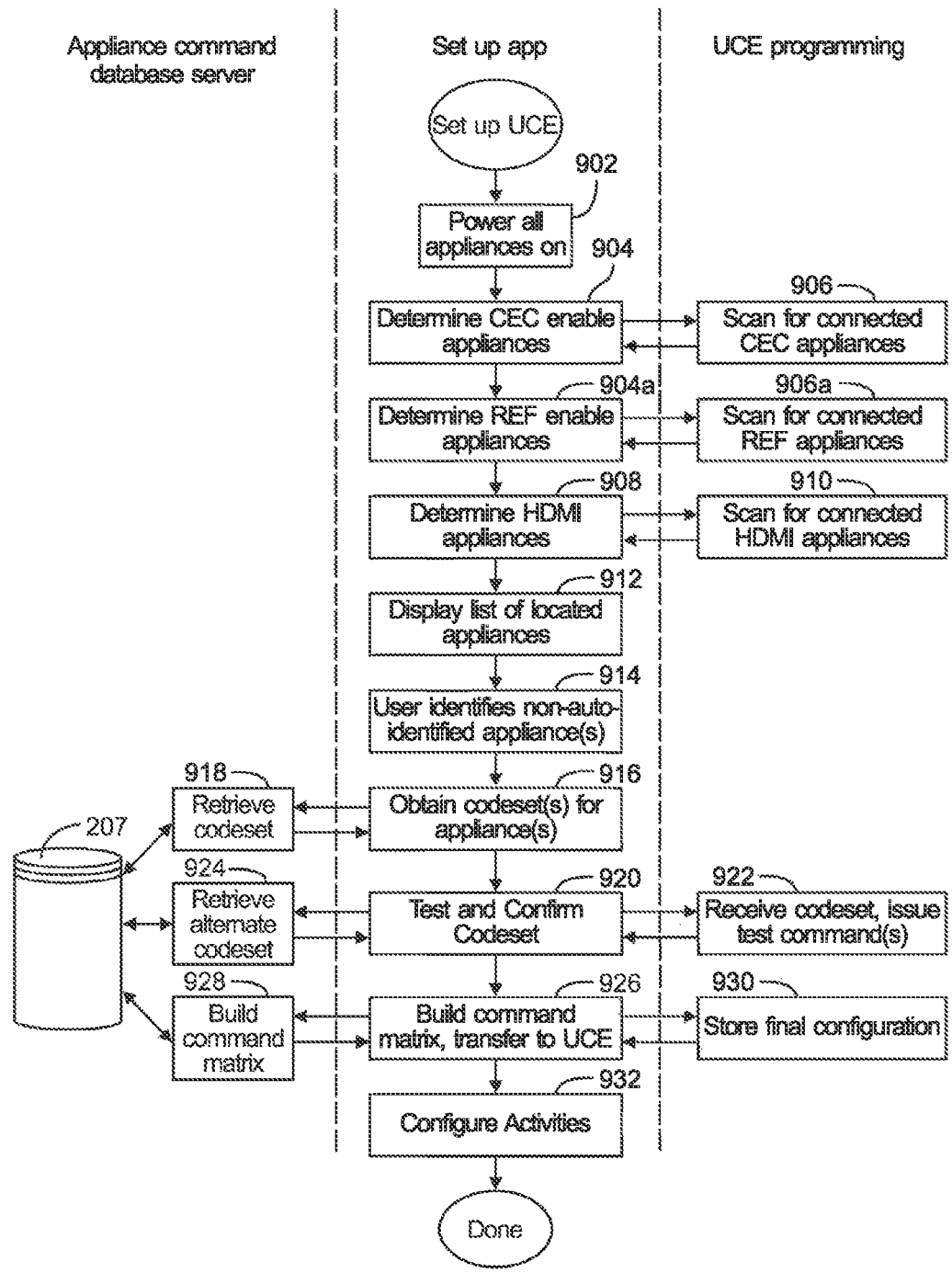
FIG. 9 illustrates an example series of steps which may be performed in order to set up and configure the smart device of FIG. 8.

With reference now to FIG. 9 such a setup app, upon being invoked at step 902 may initially request that the user place all of the appliances to be controlled into a known state, e.g., powered on, in order to enable the appliance detection and/or testing steps which follow. In some instances, this step may be omitted if it is determined that all appliances that are known to be within the ecosystem are already in a desired state, e.g., powered on. This determination may be monitored by monitoring the state of hardware that is associated with or otherwise connected to any such appliances. Next, at steps 904 and 904*a* the setup app may determine the identity of those appliances (and, thereby, determine those appliances which are CEC-enabled, RF enabled (e.g., RF4CE-enabled), etc.) This may be accomplished by communicating a request to the associated device 100, which at step 906 may, for example, cause the device programming to scan connected "HDMI" devices for appliances which are CEC-enabled and/or identifiable via interaction over the "HDMI" interface, for example as described in U.S. Pat. No. 8,812,629, of like assignee and incorporated herein by reference in its entirety, and communicate such appliance identities to the setup application. Likewise, this may be accomplished by communicating a request to the associated device 100, which at step 906*a* causes the device programming to scan for appliances which are RF-enabled and/or identifiable via interaction over one or more communication interfaces.

Thereafter, at step 908 the setup application may determine if additional non-CEC appliances are connected to the device 100 via the "HDMI" interface. This may be accomplished by requesting the device programming to scan for any further "HDMI" connections at step 910 and communicate the findings back to the setup application. Though not illustrated, it will be appreciated that where appropriate for a particular embodiment the device programming may conduct similar scans to in order to discover appliances connected via Ethernet, "USB," "BLUETOOTH," "RF4CE," "WIFI," etc., where such interfaces may be provisioned to a device 100.

Thereafter, at step 912 the setup application may display or otherwise communicate a listing of detected appliances (both identified and not yet identified) to the user. At step 914, the user may be prompted to enter appliance identifying information for those "HDMI" or otherwise connected appliances which were detected but not identified, as well as identifying information regarding any additional appliances which may form part of the system to be controlled but are not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; etc.; or any combination thereof as appropriate for a particular embodiment.

As noted above, once sufficient identifying information has been acquired, at step 916 the setup app may communicate that information to a database/cloud server, for example server 206, for performance of step 918, comprising identification of and retrieval of command codeset and capability data corresponding to the identified appliances and/or one or more appropriate "skills" from a database 207. The database/cloud server may also maintain an indication of the particular platform that is associated with the device, for example, whether the device is an "ANDROID" platform device, an "IOS" platform device, a "SONY" platform device, an "AMAZON" platform device, a "ROKU" platform device. In this context, the platform of a device will generally correspond to an "app store" from which apps supported by the platform/device may be downloaded as needed.

The identified codeset, capability data, skills, or the like will then be provisioned to the setup application for processing and ultimate transfer to the device 100 in whole or in part. As will be appreciated, a transferred codeset may comprise complete command data values, formatting information, and/or one or more further transmission related parameters that would be used to transmit a command via a wireless connection, e.g., IR, RF, etc., or via a wired connection, may comprise one or more pointers to such command data values, formatting information, and/or one or more further transmission related parameters that are already stored in the memories 502 and/or 802/804 of the device 100 or the device upon which the setup application is currently resident, or a combination thereof. Where necessary, for example when database 207 may contain alternate codesets for an identified appliance, or where uncertainty exists regarding a particular appliance model number, etc., at steps 920, 922, and 924 various control paradigms and/or command data sets may be tested against the appliances to be controlled. Such testing may take the form of soliciting user response to effects observable commands, monitoring of "HDMI" interface status changes as described for example in U.S. Pat. No. 9,019,435, of like assignee and incorporated herein by reference in its entirety, or any other method as convenient for a particular application. Once appropriate codesets have been fully determined, at steps 926,928 and 930 a suitable preferred command matrix, for example as illustrated in FIG. 7, may be constructed and stored into the memory 502 of example device 100, the matrix being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g., apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

The construction of said preferred command matrix may be performed at the database server or within the setup application, or a combination thereof, depending on the particular embodiment. Once a preferred command matrix has been finalized and stored in the device 100, at step 932 a series of desired appliance configurations associated with specific user activities may be configured and stored into the device 100, as will be now be described.

Figure 10:
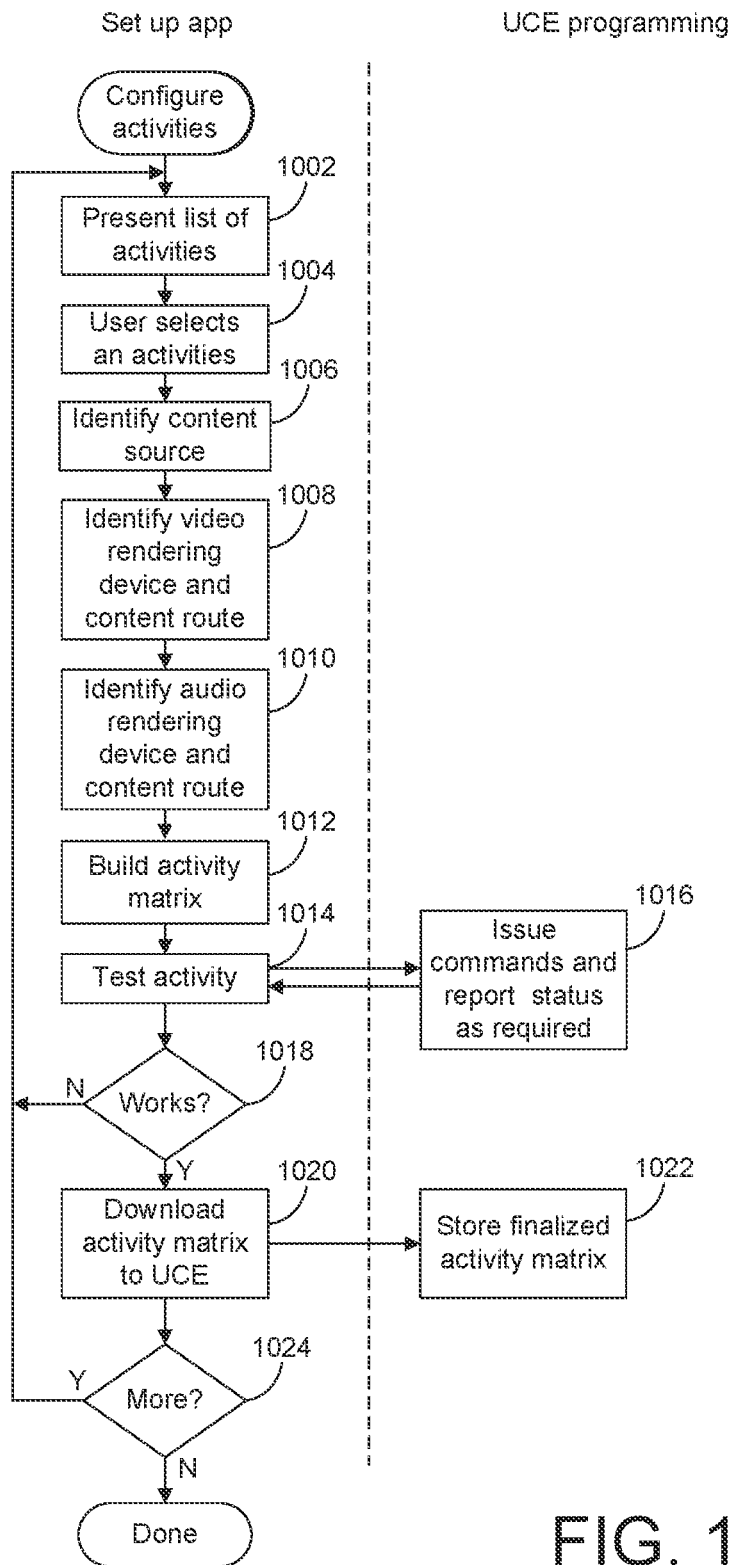
FIG. 10 illustrates an example series of steps which may be performed in order to define an appliance configuration which corresponds to a user activity.

Upon completion and storage of a preferred command matrix, an example setup application may subsequently guide a user through a series of steps in order to establish the desired appliance configurations for a series of possible activities. With reference to FIG. 10, at step 1002, the user may be presented with a list of possible activities, e.g., "Watch TV", "Watch a movie", "Listen to music", etc. In some embodiments, the user may also be able to edit activity titles and/or create additional user defined activities. At step 1004 a user may select a particular activity for configuration, for example "Watch TV". At step 1006, the user may be prompted to identify the content source for the activity being configured, for example cable STB/DVR 110 for the example "Watch TV" activity. Such a prompt may take the form of a listing of eligible appliances as determined during the foregoing appliance set up steps; explicit user provision of an appliance type; etc. Next, at steps 1008 the user may be prompted in a similar manner to select video and audio rendering appliances for use in this activity, for example TV 106 and AVR receiver 120 respectively. Depending upon the system topography and the interfaces in use (i.e. "HDMI"/ CEC, IP, analog, etc.) the setup application in concert with device programming may be able to ascertain which input port of each rendering appliance is attached to the content source appliance identified for this activity and/or if any intermediate switching appliance is in use (for example AV receiver 420 of the system illustrated in FIG. 4). Where such information is obtainable, the setup application may automatically create all or part of an appropriate rendering device input selection for the activity being configured. If not, at steps 1008 and 1010, the user may be additionally requested to identify the applicable content route(s) to the rendering appliances, e.g., input port numbers, presence of intermediate switches, etc.

During or upon conclusion of steps 1004 through 1010, the setup application may construct an activity matrix, for example as illustrated in FIG. 11. By way of example, activity matrix 1100 for a "Watch TV" activity may comprise a series of cells, for example 1110 or 1112, each corresponding to a desired configuration of a particular state 1106 or function 1108 of a specific appliance 1104 during the specified activity. By way of example, cell 1110 may indicate that the input of AV receiver 120 is to be set to "S/PDIF2", while cells 1112 and 1114 may indicate that transport function commands (e.g., "play", "pause", "fast forward" etc.) are to be directed to STB/DVR 110 and not to DVD 114. In this regard, it will be appreciated that while in some embodiments the assignment of functions such as, for example, volume control, to specific appliances during a particular activity may be performed within an individual controlling device, i.e., the controlling device may determine the appliance to which volume control commands are to be directed, in a preferred embodiment this assignment may be performed within the device 100, thereby ensuring consistency across each activity when multiple controlling devices are present in an environment, for example devices 102 and 104 of the environment illustrated in FIG. 1.

Returning now to FIG. 10, at steps 1014 and 1016 the newly-constructed activity matrix 1100 may be tested by causing the device programming, utilizing preferred command matrix 700, to issue the commands necessary to place the identified appliances into the desired state and thereafter receiving verification at step 1018 that the desired activity was successfully initiated. It will be appreciated that such verification may comprise, for example, detection and reporting of "HDMI" or other content streams and/or appliance status by device programming by directly monitoring CEC status or by using methods such as described for example in U.S. Pat. No. 9,019,435; solicitation of user input confirming correct operation; monitoring for presence or absence of analog input signals; recording of appliance status or error messages; etc.; or any combination thereof as appropriate for a particular embodiment.

If testing is unsuccessful, at step 1018 the setup application may return to step 1002 to allow reconfiguration of that activity and/or definition of alternative activities. If testing was successful, at steps 1020 and 1022 the completed activity matrix, for example 1100 as illustrated in FIG. 11, may be transferred to the device 100 for storage in device memory 502. Thereafter, at step 1024 the user may be offered the opportunity to return to step 1002 to define additional activity configurations, for example 1101,1102 as illustrated in FIG. 11, or to exit the activity configuration process.

Figure 13:
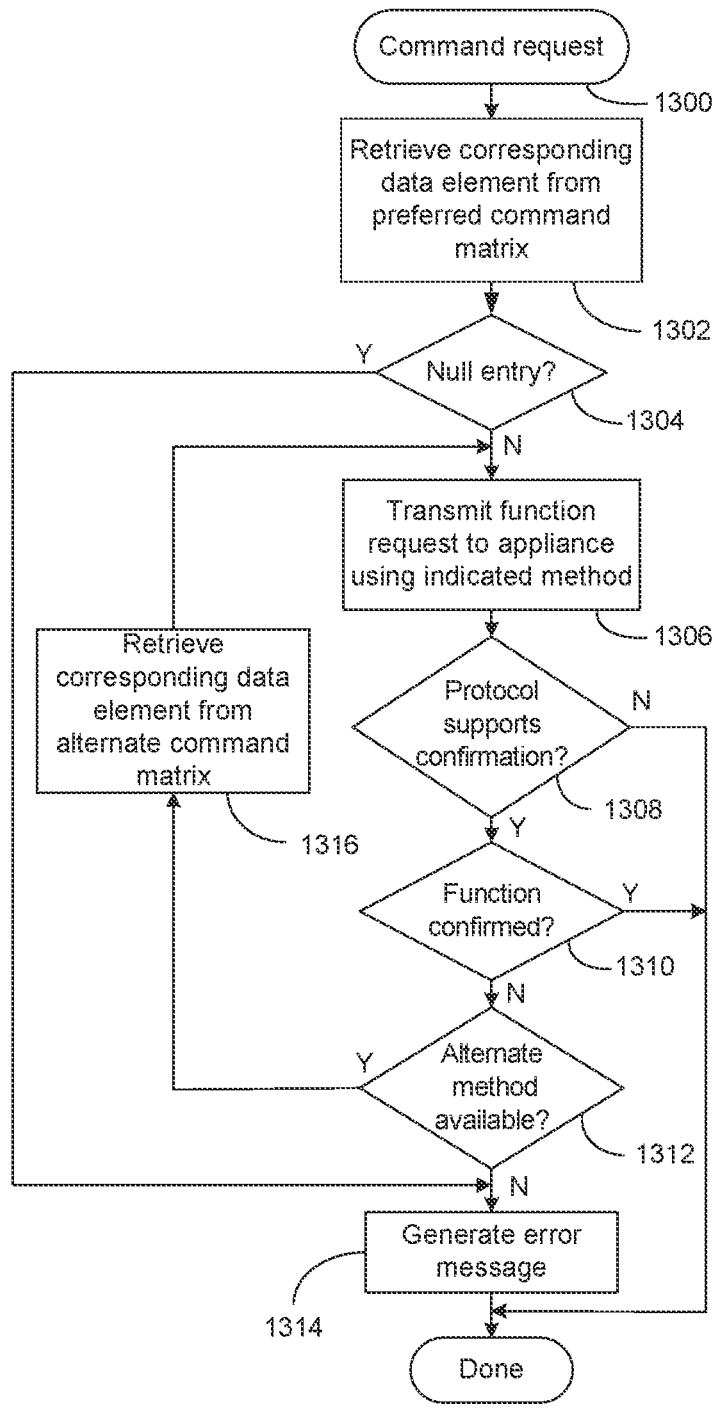
FIG. 13 illustrates an example series of steps which may be performed by a controlling device in issuing a function command to an appliance.

With reference now to FIG. 13, the series of steps performed by the device programming in order to convey a function command to an appliance in accordance with a command request 1300 received from a controlling device such as remote control 102 or 200, smart device 104 or 202, via voice input, etc., or in accordance with an internally generated requirement resulting from receipt of an activity request (as will be described hereafter) may initially comprise retrieval from a preferred command matrix that data element which corresponds to the requested command and target appliance. By way of specific example, receipt of a "TV power on" request from remote control 102, via voice input, or the like at a device 100 provisioned with the preferred command matrices illustrated in FIG. 7 may cause retrieval of data element 720, indicating that the command is to be communicated to the TV appliance, e.g., television 106, using an "HDMI"/CEC command. At step 1304, the device programming may determine if the retrieved value constitutes a null element. If so, the referenced appliance does not support the requested command and accordingly at step 1314 an error message may be generated and the process thereafter terminated. As will be appreciated, the exact nature of such an error message may depend upon the particular embodiment and/or the requesting controlling device: for example, if the request originated from a controlling device which is in bidirectional communication with the device the error may be communicated back to the requesting device for action, i.e., display to the user, illuminate a LED, activate a buzzer, etc. as appropriate. Alternatively, in those embodiments where a device 100 is incorporated into an appliance as device 100', that appliance's front panel display, LEDs, speaker, etc. may be utilized to convey an error message.

If the retrieved preferred command matrix element data is valid, at step 1306 the device 100 may communicate the corresponding function command to the target appliance using the indicated command value and transmission method, e.g., for the example data element 720 this may comprise issuing a CEC "power on" command to CEC logical device address zero (TV) via the device's "HDMI" interface 508. Once the command has been issued, at step 1308 the device programming may determine if the communication interface and protocol used in issuing the command provides for any confirmation mechanism, i.e., explicit acknowledgement of receipt, monitoring of "HDMI" status on an interface, detection of a media stream or HDCP handshake, etc. If not, for example the command was issued using a unidirectional IR signal and no other confirmation means such as power or input signal monitoring is available, the device programming may simply assume that the command was successful and processing is complete. If, however, confirmation means exists, at step 1310 the device programming may wait to determine if the command was successfully executed. Once positive confirmation is received, processing is complete. If no confirmation or a negative confirmation is received, at step 1312 the device programming may determine if an alternative method is available to communicate the command to the target appliance. Returning to the specific example presented above this may comprise accessing a secondary command matrix 716 in order to determine if an alternative communication method is available for the specific function, e.g., "TV power on." If an alternative does exist, at step 1316 the substitute command value and transmission method may be retrieved and processing may return to step 1306 to initiate an alternative attempt. Returning again to the specific example, if the CEC "power on" command corresponding to data element 720 of matrix 700 issued to TV 106 cannot be confirmed, an IR "power on" command encoded according to SIRCS (Sony Infrared Control System) in correspondence with the equivalent data element in secondary matrix 716 may be attempted as a substitute.

In addition to relaying individual command requests as described above, an example device 100 may also support activity selection, whereby receipt of a single user request from a controlling device, via voice input, or the like may cause a series of commands to be issued to various appliances in order to configure a system appropriately for a particular user activity, such as for example, watching television. To this end a set of matrices defining desired equipment states suitable to various activities, for example as illustrated at 1100 through 1102 of FIG. 11, may be stored in device memory 502 for access by device programming when executing such a request.

As illustrated in FIG. 12, in some embodiments the programming of an example device 100 may maintain an additional matrix 1200 representative of the current state of the controlled appliances, arranged for example by appliance 1202 and by operational state 1204. By way of example, data elements 1206 and 1208 in the illustrative table 1200 may indicate that TV 106 is currently powered on (1208) with "HDMI" port number 2 selected as the input (1206). The data contents of the elements in such a table may be maintained in any convenient manner as appropriate to a particular embodiment, for example without limitation retrieval of "HDMI"/CEC status; monitoring input media streams and/or HDCP status; measuring power consumption; construction of a simulated appliance state such as described for example in U.S. Pat. No. 6,784,805; etc.; or any combination thereof. In the case of certain appliances, such as for example AV receiver 120 which may be controllable only via unidirectional IR, the current state of the appliance may not be discernible. In such cases, a null data element 1210 may be entered into example matrix 1200 to indicate that this appliance may require configuration using discrete commands only and/or user interaction. In some embodiments the data contents of the illustrative table may be maintained in memory 502 on an ongoing basis by device programming, while in other embodiments this data may be gathered "on the fly" at the time the activity request is being processed. Combinations of these methods may also be used, for example "on the fly" gathering for appliances connected via an HDMI bus combined with maintenance of a simulated state for appliances controlled via IR signals.

Figure 14:
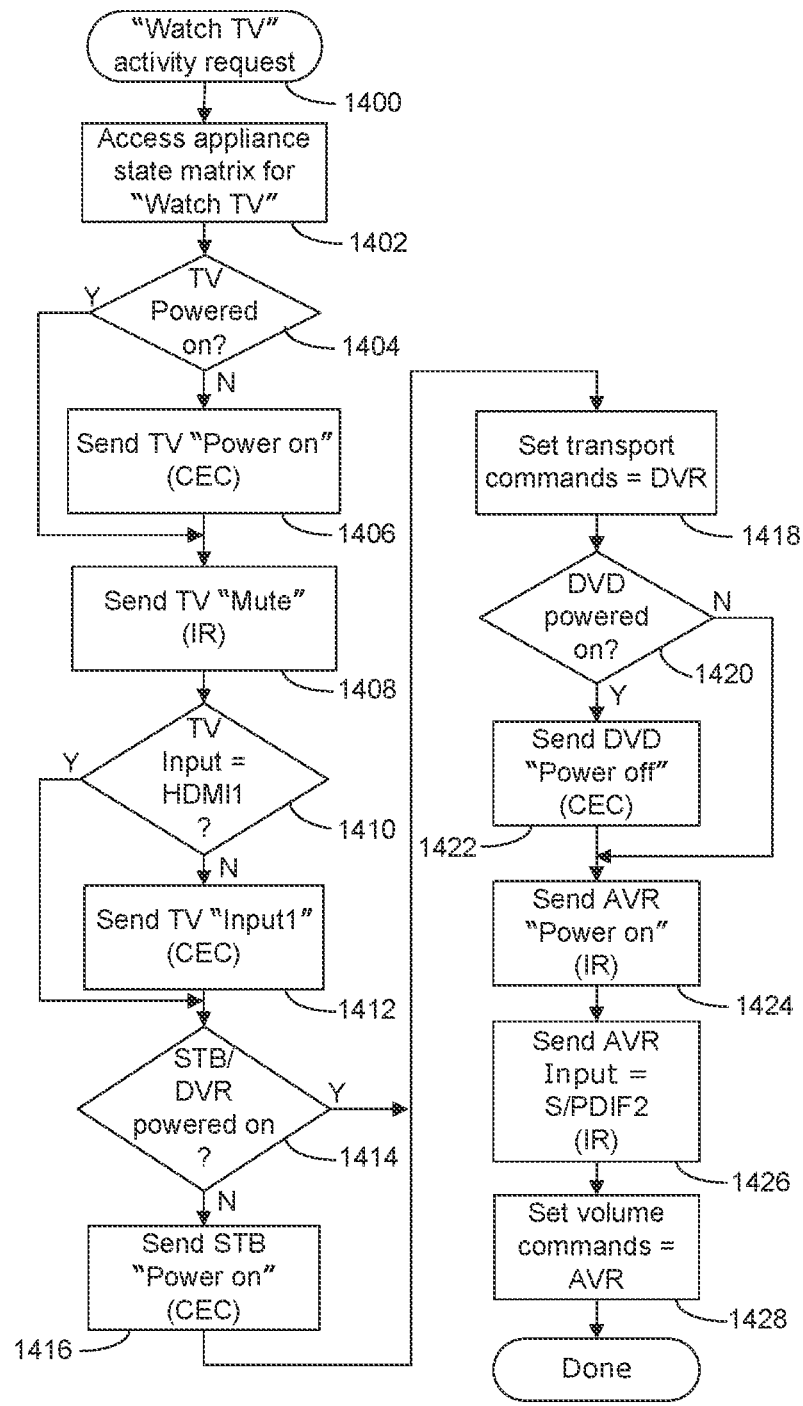
FIG. 14 illustrates an example series of steps which may be performed by a controlling device in establishing appliance states matching a desired activity defined in one of the matrices of FIG. 11.

In order to configure a group of appliances for a desired activity, device programming may compare a desired state matrix, for example 1100, to a current state matrix, for example 1200, element by element, issuing commands as necessary to bring appliances to the desired state. By way of example, an example series of steps which may be performed by the programming of a device in order to affect a "Watch TV" activity configuration will now be presented in conjunction with FIG. 14. For the purposes of this example, the reader may also wish to reference the equipment configuration of FIG. 1 and the activity and current state matrices 1100 and 1200 of FIGS. 11 and 12.

Upon receipt of a "Watch TV" request 1400, at step 1402 the example device programming may access an applicable appliance state matrix 1100. Next, at step 1404 it may be determined by the device programming whether the present "power" state of TV 106 as indicated by current state matrix 1200 matches the desired state stored in the corresponding data element of matrix 1100. If the states match, processing may continue at step 1408. If the states do not match, at step 1406 a "power on" command may be communicated to TV 106. As will be appreciated from the earlier discussion in conjunction with FIG. 13 and inspection of example preferred command matrix 700, in the illustrative system communication of the "power on" command to TV 106 may comprise a CEC command issued over "HDMI" connection 112. Next, at step 1408 a "mute" command may be communicated to TV 106, since element 1116 of illustrative matrix 1100 indicates that TV 106 is not the primary audio rendering appliance. In accordance with preferred command matrix 700, communication of the "mute" command to TV 106 may comprise an IR transmission 114. Thereafter, at steps 1410,1412 the active input of TV 106 may be set to "HDMI1" via a CEC command, and at steps 1414,1416 a CEC "power on" command may be communicated to STB/DVR 110 if that appliance is not already powered on. At step 1418, the example device programming may set an internal status to indicate that future transport command requests (e.g., play, pause, FF, etc.) should be routed to STB/DVR 110, as indicated by element 1112 of matrix 1100. Thereafter, at steps 1420,1422 a CEC "power off" command may be communicated to STB/DVR 108 if that appliance is not already powered off. Thereafter, at steps 1424 and 1426 "power on" and "input S/PDIF2" commands may be communicated to AV receiver 120 via IR signals. As will be appreciated, it may not be possible to determine the current status of AV receiver 120, as indicated for example by elements 1210 and 1220 of matrix 1200, and accordingly so-called "discrete," or explicit, function commands may be issued which may establish the desired status regardless of the current state of the appliance. Finally, at step 1428 the example device programming may set an internal status to indicate that future volume control command requests (e.g. volume up/down, mute) should be routed to AV receiver 120, as indicated by element 1118 of matrix 1100, whereupon processing of the activity request is complete.

Figure 15:
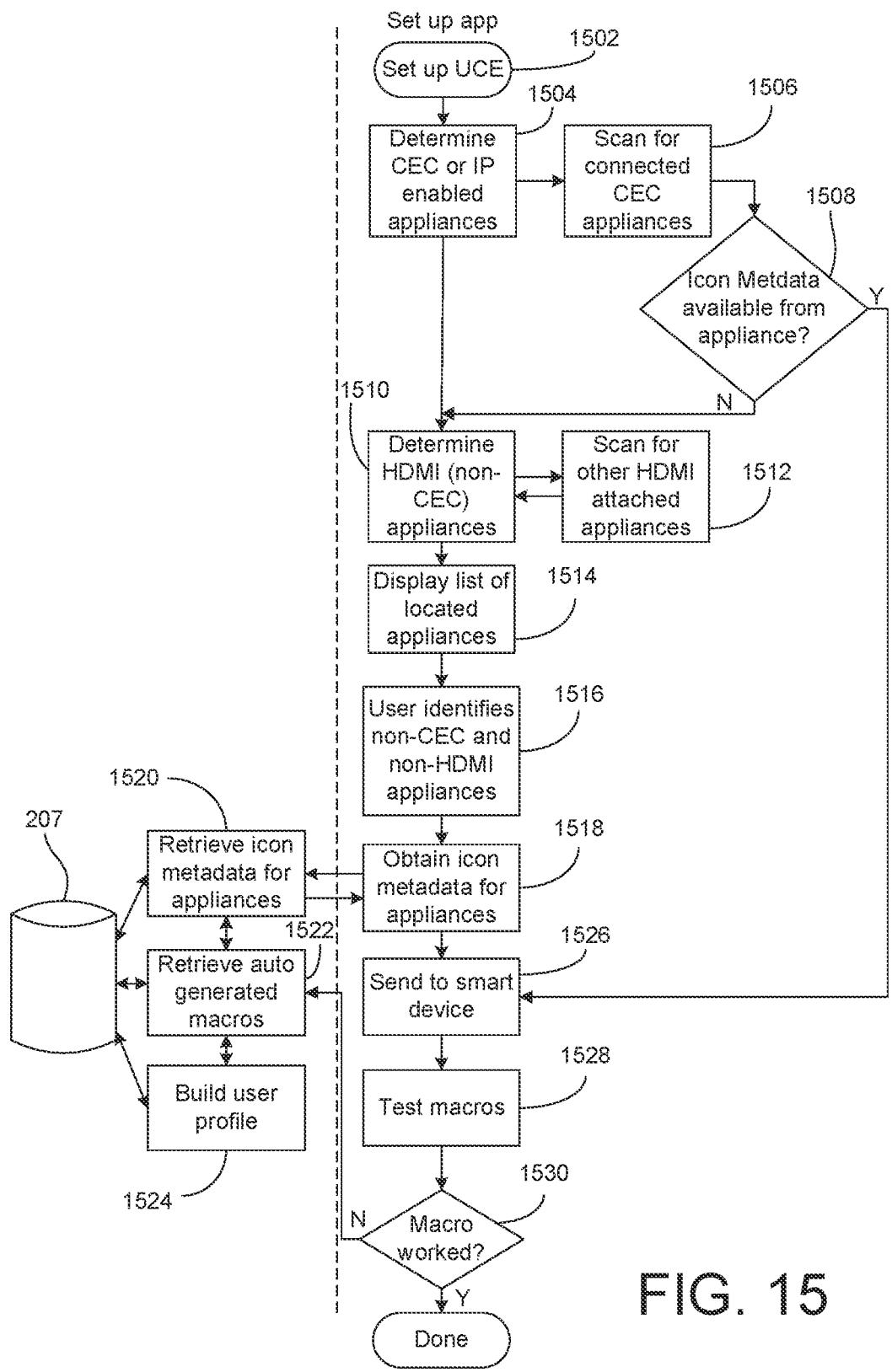
FIG. 15 illustrates an example series of steps which may be performed by a smart device to setup command control macros.

As noted above, the example device 100 may also support activity selection, whereby receipt of a single user request from a smart device, via a voice signal, etc., may cause a series of commands to be issued to various appliances in order to configure a system appropriately for one or more user activities, such as "watch TV," "watch movie," "listen to music," etc. To setup the user interface of the smart device to support such macro command functionality, an example method is illustrated in FIG. 15. More particularly, with reference to FIG. 15, upon invocation of a setup app at step 1502 a user may be requested to place all of the appliances to be controlled into a known state, e.g., powered on or already joined in a wireless network, in order to enable the appliance detection and/or testing steps which follow. Next, at step 1504 the setup app may determine the identity of those appliances, and thereby determine which of those appliances are CEC-enabled or IP enabled. This may be accomplished by communicating a request to the associated device 100, which at step 1506 may cause the device programming to scan connected "HDMI" devices for appliances which are CEC-enabled and/or identifiable via interaction over the "HDMI" interface, for example as described in U.S. Pat. No. 8,812,629, of like assignee and incorporated herein by reference in its entirety, and communicate such appliance identities to the setup application.

At step 1508 the setup app may also determine if the appliances have any associated icon information (for example stored as metadata on the appliance, available from a remote server, or the like) as well as information related to interface connection types, e.g., "WIFI," "HDMI" input/output, for use in the creation of supported macros. If the icon information is available, the icon information may be sent to the smart device by the appliance and/or retrieved by the smart device using other information provided by the appliance as appropriate as shown in step 1526. An icon corresponding to the icon information may then be automatically added to the user interface of the smart device whereupon an activation of the added icon may be used to provide access to command and control functionalities associated with the corresponding controllable device, including commands in the form of a listing of automatically generated macros available for that controllable device as described below. Thus, icon information provided to the smart device may be used in connection with information stored on the smart device, stored in the interne cloud and/or at a remote server to automatically add an icon to the user interface of the smart device where the icon can be in the form of a logo for the controllable appliance, icons in the form of logos for content (e.g., television station logos), icons for services, etc. that can be accessed via the controllable appliance, etc. In a further illustrative embodiment, icons may function as soft keys which may be selected to cause the performance of a further action for example, to display a device control page (e.g., to present television control soft keys such as channel up, channel down, etc.), cause the transmission of commands, etc. as described for example in U.S. Pat. No. 7,831,930 of like assignee and incorporated herein by reference in its entirety, or any other method as convenient for a particular application. In a similar manner, an appropriate app or "skill" can be retrieved for use by the smart device, for example from a cloud-based service, to enable the smart device (which may or may not include an associated display) to provide an appropriate user interface, to receive input via use of a voice signal, and/or to enable transmission and/or receipt of desired signals to and/or from the device 100.

The setup application then continues to step 1510 (after scanning for CEC connected appliances as discussed above) whereat the setup application may next determine if additional non-CEC appliances are connected to the device 100 via the "HDMI" interface. This may be accomplished by requesting the device programming to scan for any further "HDMI" connections at step 1512 and communicate the findings back to the setup application. Though not illustrated, it will be appreciated that, where appropriate for a particular embodiment, the device programming may conduct similar scans in order to discover appliances connected via Ethernet, "USB," "BLUETOOTH," "RF4CE," "WIFI," etc., where such interfaces may be provisioned to a device 100.

Thereafter, at step 1514 the setup application may display, annunciate, etc. a listing of detected appliances (both identified and not yet identified) to the user. At step 1516, the user may then be prompted to provide appliance identifying information for those "HDMI" or otherwise connected appliances which were detected but not identified, as well as identifying information regarding any additional appliances which may form part of the system to be controlled but which were not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; MAC address; etc.; or any combination thereof as appropriate for a particular embodiment.

Once appropriate identifying information has been acquired, at step 1518 the setup app may communicate that information to a database server, for example server 206, for performance of step 1520 in which the database server uses the identification information to retrieve icon information as needed (e.g., when such data was not obtainable from the appliance), command information, and/or app/"skill" programming as discussed previously, and in step 1522, to automatically generate executables, including macros which correspond to the appliance or a plurality of appliances considering their capability data as maintained in a database 207 and/or as retrieved from the appliances. Any such data gathered from and/or created by the server 206 will then be provisioned to the setup application for processing and ultimate transfer to the smart device and/or device 100 as required. As will be appreciated, the transferred information and/or metadata may comprise user interface data, complete command data values, appliance input/output data and current status, formatting information, pointers to command data values and formatting information already stored in the memories 502 and/or 802/804 of the device 100 or the device upon which the setup application is currently resident, etc. Where necessary, for example when database 207 may contain alternate codesets, icon metadata, or macro information for an identified appliance, or where uncertainty exists regarding a particular appliance model number, etc., at steps 1528, 1530, and 1522 various control paradigms and/or command data sets may be tested against the appliances to be controlled. Such testing may take the form of soliciting user response to effects observable commands, monitoring of "HDMI" interface status changes as described for example in U.S. Pat. No. 9,019,435, of like assignee and incorporated herein by reference in its entirety, or any other method as convenient for a particular application. Once appropriate codesets and macro operations have been fully determined, at steps 1528 and 1530 a suitable preferred user profile 1524, may be constructed and stored into the memory 502 of example device 100, the user profile 1524 being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g., apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g.

received IP received packets processed before CEC packets, etc.; type of protocol support (e.g. error correction versus error detection; ack/nak, etc.); or any other factors which may applied in order to achieve optimum performance of a particular embodiment.

As will be appreciated, the construction of said user profile 1524 may be performed at the database server or within the setup application, or a combination thereof, depending on the particular embodiment.

Figure 16:
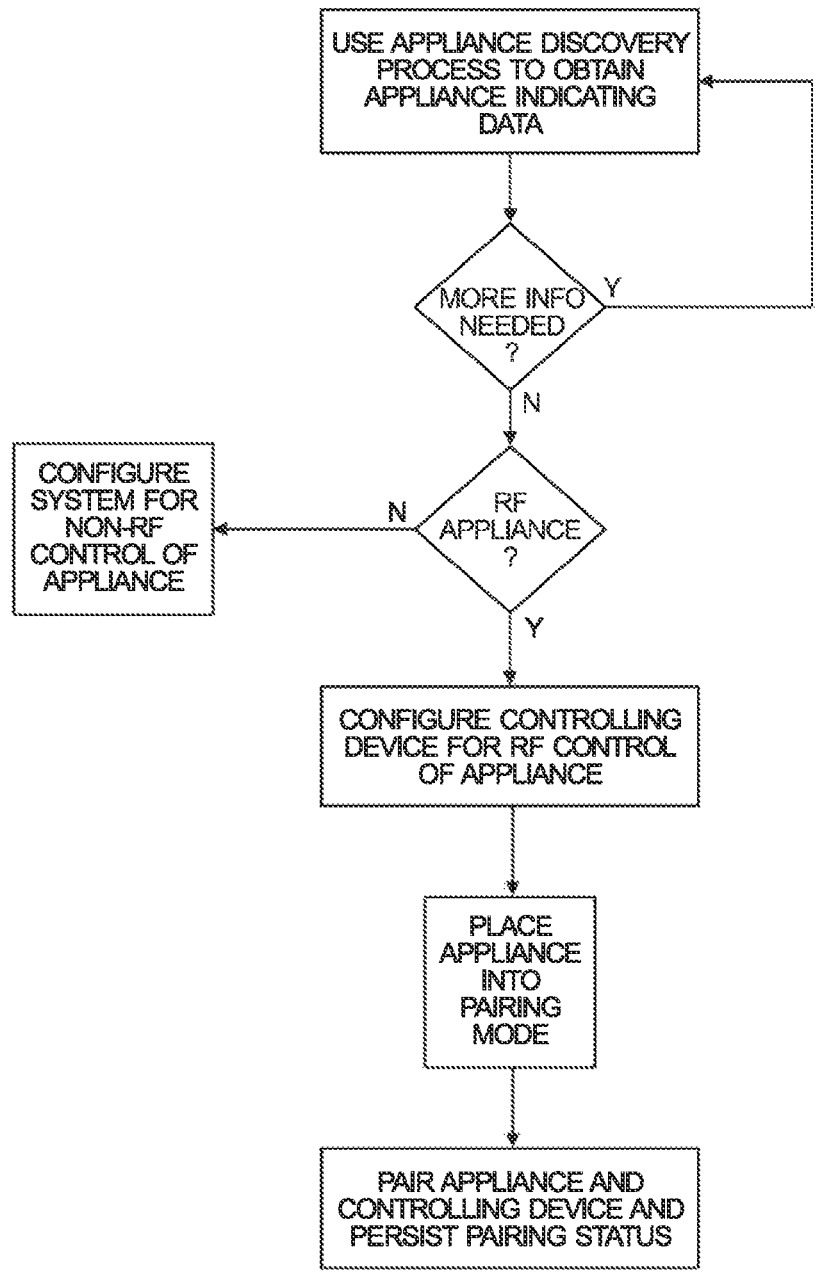
FIG. 16 illustrates an example series of steps which may be performed to configure a controlling device for issuing command communications via use of RF communication methodologies

It is also contemplated that the methods described above can be used to provide a device 100 with universal RF controlling capabilities. To this end, as illustrated in FIG. 16, a host device, e.g., a device 100 having some or all of the functionalities described above, can use an appliance discovery process, which may entail using a multi-cast discovery schema, to obtain information about one more appliances 106, 108, 110, etc. For example, the host device may, through use of the appliance discovery process of a setup application, such as described in U.S. Pat. No. 8,812,629, receive from an appliance through use of an interconnection with the appliance, e.g., a wired or wireless coupling between the appliance and the host device, first appliance related data, e.g., appliance ID, brand name, model number, name, parameters associated with a communication methodology supported by the appliance, etc. The first appliance related data retrieved from the appliance (if the first appliance related data does not itself indicate that the appliance is responsive to a particular RF protocol) can then be used to determine if the first appliance related data received from the appliance corresponds to a single one of the plurality of appliance records/appliance profiles that are stored within a database (for example, a database associated with a cloud server) or multiple ones of the plurality of appliance records stored within the database as described previously. It is to be further appreciated that such information may be obtained by reading such information from a provided token, QR code, or the like as also described previously.

When it is determined that the first appliance related data received from the appliance corresponds to a single one of the plurality of appliance records stored within the database and the single one of the plurality of appliance records indicates that the appliance is adapted to receive command communications via use of a RF communications channel, e.g., the appliance is "RF4CE" compliant, an RF codeset identifier associated with the one of the plurality of appliance records may be used to select from a plurality of codesets the RF codeset that is supported by that appliance. A controlling device in communication with the host device (or the host device itself) can then be provisioned with the indicated RF codeset—as described above—to thereby configure the controlling device (or the host device in the event the host device is intended to be a controlling device) to issue commands directly to the appliance, via use of a RF transmitter, where the command that is caused to be issued for reception by the appliance will correspond to a command event received at the controlling device, e.g., an event indicative of an input element being activated, a communication being received from an external device, etc. Likewise, via use of such gathered information, a smart device in communication with the device 100 can be provisioned with an app/"skill" to provide an appropriate user interface, to receive input via use of a voice signal, and/or to enable transmission and/or receipt of desired signals to and/or from the device 100 as needed or required.

When it is determined that the first appliance related data received from the appliance corresponds to multiple ones of the plurality of appliance records within the database, further appliance related data, e.g., further ones of appliance ID, brand name, model number, name, parameters associated with a communication methodology supported by the appliance, etc., is preferably caused to be iteratively received from the appliance through use of the same or other interconnections with the appliance until such time as no further appliance related data is capable of being retrieved from the appliance or until such time as all appliance related data received from the appliance corresponds to a single one of the plurality of appliance records stored within the database. Again, as before, when it is determined that the collective appliance related data received from the appliance corresponds to a single one of the plurality of appliance records within the database and the single one of the plurality of appliance records indicates that the appliance is adapted to receive command communications via use of a RF communications channel, e.g., the appliance is "RF4CE" compliant, an RF codeset identifier associated with the one of the plurality of appliance records may be used to select from a plurality of protocol codesets the RF codeset that is supported by that appliance. A controlling device, e.g., remote control 104 in communication with the host device (or the host device itself), can then be provisioned with the indicated RF codeset to thereby configure the controlling device (or the host device) to issue commands directly to the appliance, via use of a RF transmitter, where the command issued will correspond to a command event. Thus, it is to be appreciated that automatic device discovery and pairing actions described herein may be possible using partial data received from and or communicated via one or more input/output connections of one or more protocol types and that the controlling device having device 100 functionality may accordingly have multiple input/output connections and support one or more protocol types. For example, the controlling device having device 100 functionality may support "BLUETOOTH" low energy (BLE), "ZIGBEE," and/or "RF4CE" or otherwise use the same radio but with a different network protocol stack without limitation.

Once the appliance discovery and configuration processes have been completed and the controlling device loaded with the specific profile for the appliance, a RF pairing operation between the controlling device and the appliance is caused to be performed. In some instances, a command to place the appliance into a state for pairing the appliance with the controlling device may be transmitted to the appliance, whether initiated automatically upon conclusion of the discovery and configuration processes or initiated manually, via use of a protocol, e.g., IR, IP, CEC, etc., that the appliance profile indicates the appliance is responsive to. In this regard, the command for placing the appliance into a state for pairing may be issued from the controlling device or the host device as desired and in keeping with communication links available for use in transmitting such a command. In other instances, human interaction with a pairing button or other input element provided on the appliance to place the appliance into a pairing state may be required for this purpose. In the pairing state, the devices will exchange pairing information as needed to allow the devices to be subsequently communicatively linked together when proximate to each other whereby the controlling device can be used to communicate commands to the appliance via use of the appropriate RF protocol. If needed, a user may be required to enter a pin into the system, as known in the art, to facilitate such pairing. An example communication exchange to facilitate a pairing between a remote control and an appliance for use in transmitting "RF4CE" commands to the appliance may be found in U.S. Pat. No. 9,866,892 the disclosure of which is incorporated herein by reference in its entirety.

Once an appliance and a controlling device are paired, it will be appreciated that if it is determined that the appliance does not respond to a command transmitted via use of a provisioned RF protocol, e.g., determined by monitoring an "HDMI" connection, other command transmission protocols, such as CEC, IR, etc., can be used to convey a command as described above.

Figure 17:
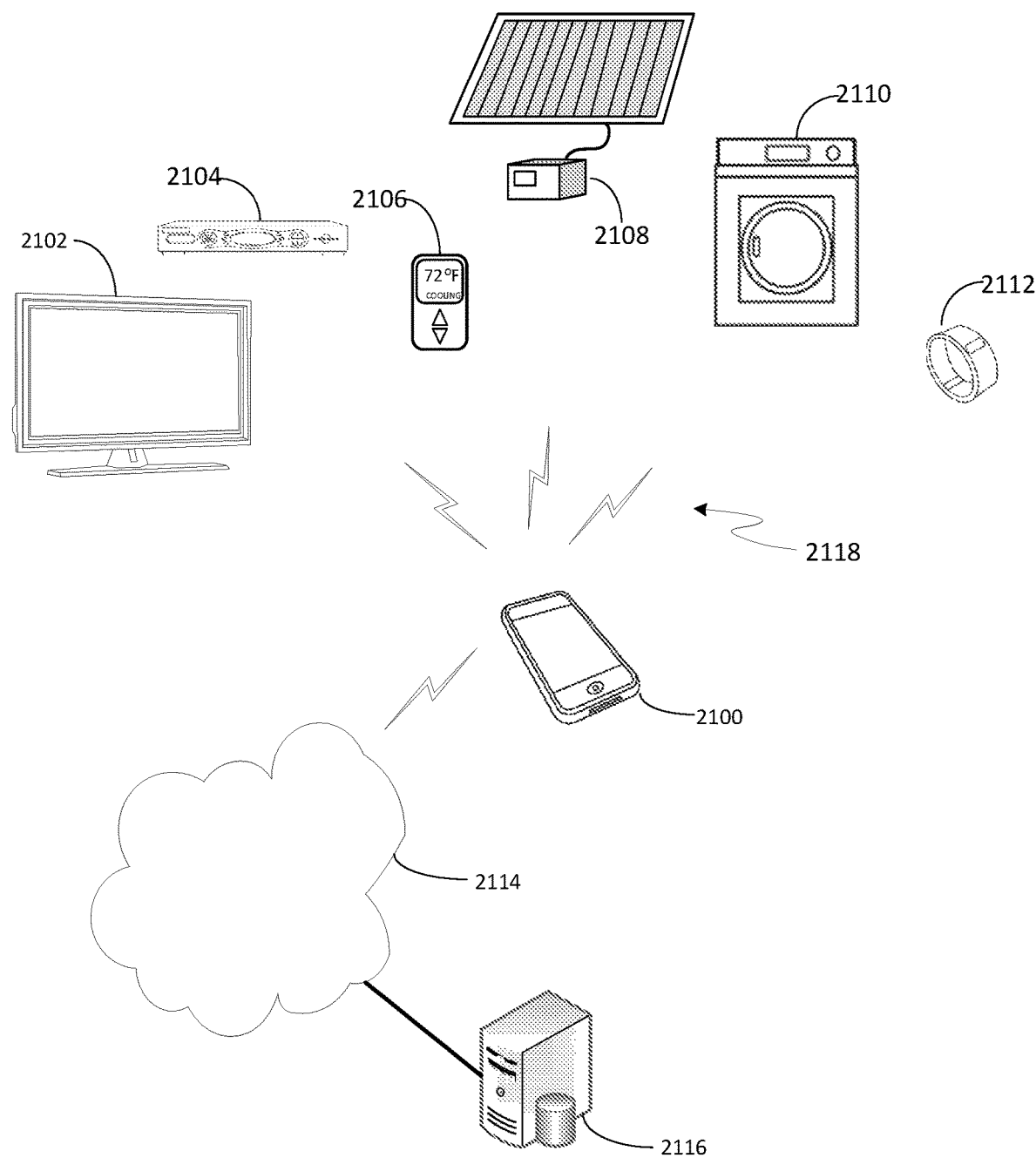
FIG. 17 illustrates an example system in which a smart device may be utilized to interface several different appliances.

As noted above, it is contemplated that, within an example system, such as illustrated in FIG. 17, apps or "skills" installed on a device 2100 may also provide interfaces to various services and/or to controllable appliances, such as, for example, a television 2102, a cable or satellite set top box 2104, a thermostat 2106, a solar power array controller 2108, a clothes washer and/or drier 2110, a personal fitness tracker or pedometer 2112, a media streaming service, a social networking service, etc. In this example, the device 2100 may be device 100 or may be a smart device that is intended to communicate with a device 100 as described above without limitation. The interfaces may be used to display or otherwise annunciate information relevant to the operation and/or states of such services or devices, to receive input relevant to controlling the operation of such services or devices, to communicate with and/or control such services or devices, etc. To this end, the appliances may communicate with device 2100 using an available local wired or wireless network 2118 such as, for example, WiFi, Bluetooth, etc., or any other convenient means. It will be appreciated that depending on the particular networking technology in use various other items such as access points, routers, Internet gateways, etc., may be required in order to fully implement the illustrative network 2118—in the interests of clarity these are omitted from FIG. 17. Also, as illustrated in FIG. 17, smart device 2100 may be adapted to communicate with one or more remote servers 2116 (which may be cloud-services) by way of a wide area network 2114, such as for example the Internet.

It should be appreciated that, while an example embodiment is presented herein in terms of a group of household and/or personal appliances 2102 through 2112, the methods described herein may broadly apply to any group of appliances or equipment the elements of which support app driven user interfacing, for example without limitation those as may be found in offices, factories, schools, theaters, etc. Accordingly, the example embodiment described hereafter is intended to be illustrative and not limiting.

Figure 18A:
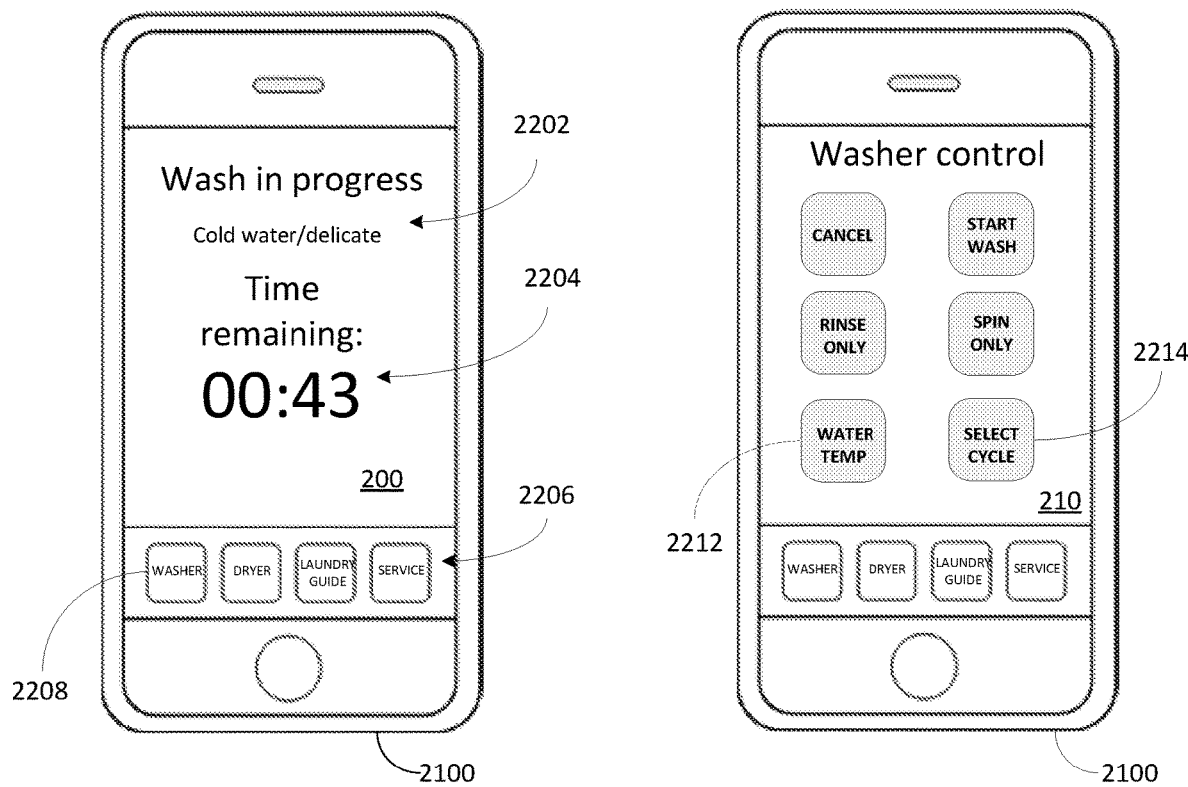
FIGS. 18A and 18B illustrate example smart device generated user interfaces appropriate for interacting with one of the appliances of FIG. 17.
Figure 18B:
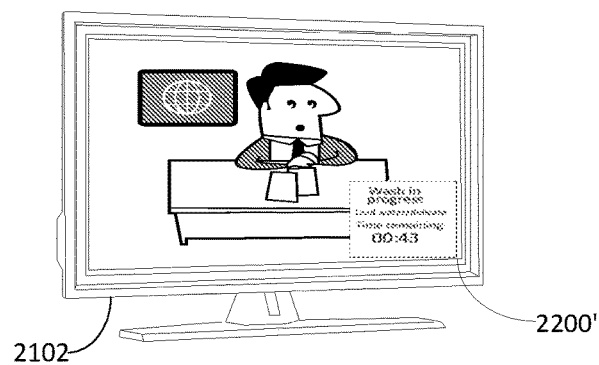

Turning now to FIG. 18A, an example user appliance interface 2200 presented by an app installed on device 2100 is shown by way of illustration. When invoked by a user of the device 2100, such an interface may display a current status of the appliance, in this illustrative example that of a clothes washer, including such example items as the wash cycle currently being performed 2202 and time remaining 2206. User interface 2200 may also include an example user input area 2206 with icons that are activable to access companion appliance (e.g., a clothes dryer), GUIs, user guides, troubleshooting diagnostics, etc., as well as an icon 2208 which may access additional page(s) 2210 of the current device GUI, for example to cancel the current operation, initiate other operations, or to invoke further submenus such as selection of water temperature 2212 or fabric cycle 2214. As illustrated by way of further example in FIG. 18B, an example appliance app GUI 2200' may be adapted as appropriate for use with other types of smart devices, for example a "smart TV" 2102. As will be appreciated, in instances where device 2100 does not itself include a display, the device 2100 can be used in connection with a further device where the further device functions to present the user interface for device 2100. Accordingly, such further device would be provided with the programming required to allow device 2100 to receive communications from and provide communications to the device 2100. Such programming may be provided to the further device via use of a further installed app or "skill." Yet further, it is to be appreciated that any information that is described herein as being presented via use of display can be presented via use of a speaker, e.g., by using synthesized voice, and any information that is described herein as being received via a use of an input element can be received via use of one or microphones, e.g., by receiving voice signals and by processing the received voice signals via use of a cloud-based voice service platform.

In certain embodiments, a displayed GUI page may contain HyperText Markup Language (hereafter referred to as "HTML") links for use in accessing appliance related information and/or services. Since methods for displayed HTML links are well known in the art, they will not be described in greater detail herein. Nevertheless, for additional details pertaining to HTML link operation, the reader may turn to commonly assigned U.S. Publication No. 2012/0278693, the disclosure of which is incorporated herein by reference in its entirety. A displayed HTML page (or speech output, illuminated LEDs, or the like) may also function to provide notifications and which may inform a user that an app update or a new app is available for a single platform or across the different platforms, including cloud-based voice service platform operating systems, in the user's environment for the one or more of appliances. The user may select a displayed link or otherwise provide a voice command to initiate a downloading of an app, an authentication of an app, and/or a commencement of a synchronization process. The GUI may also include selectable links to user manuals for the user appliances which are located within the user's environment or may include links to specific web based literature which may be used to highlight the appliance features, or may notify the user that a new app may be available for a new OS for which an app was not available as of the last synchronization cycle, etc.

Figure 19:
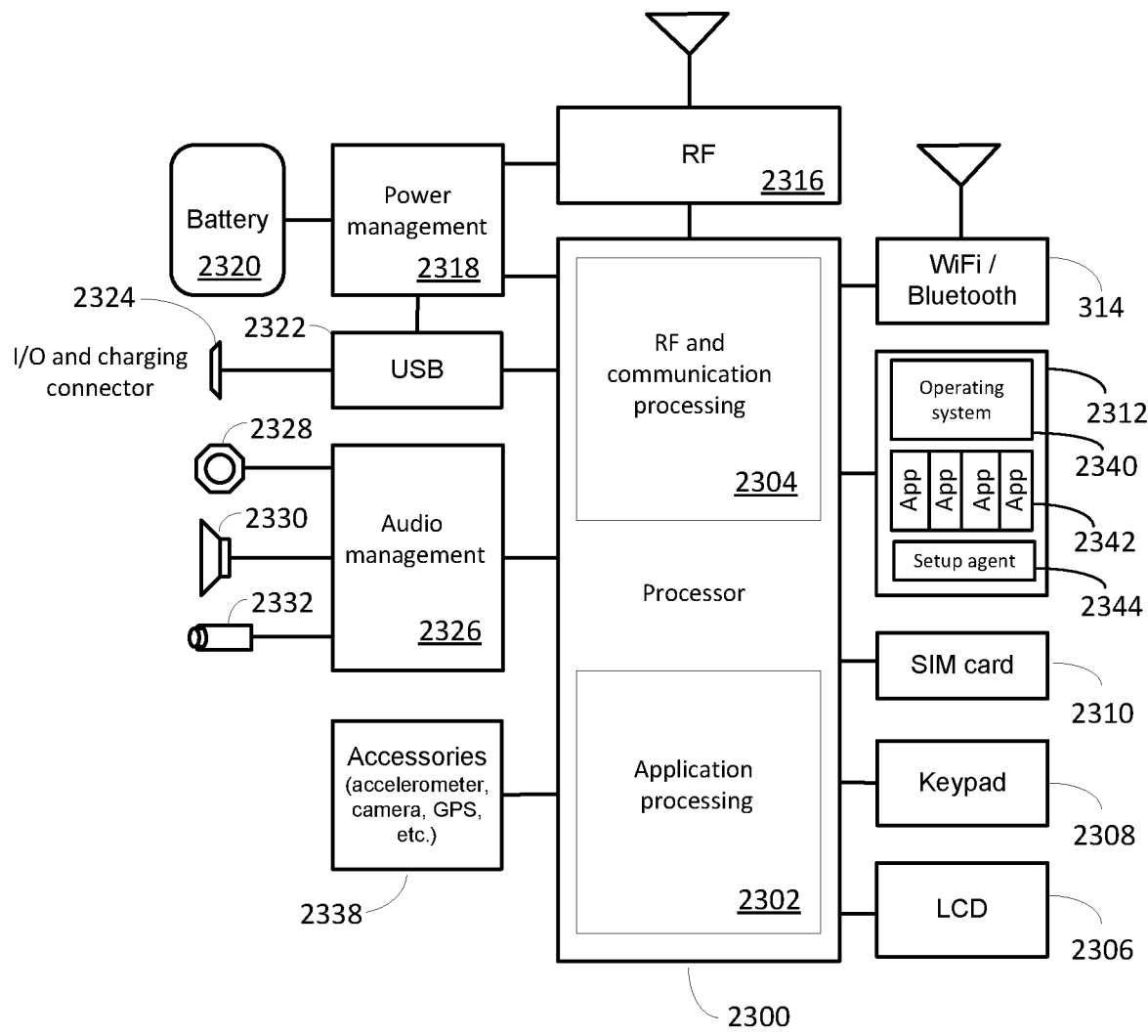
FIG. 19 illustrates in block diagram form an example smart device which may be used in the example systems of FIGS. 17 and 18A.

With reference to FIG. 19, as is known in the art, the smart device 2100 of FIGS. 17 and 18A may include as needed for a particular application, processing means 2300 which may comprise both an application processing section 2302 and an RF/communication processing section 2304; an LCD display 2306; a keypad 2308 which may comprise physical keys, touch keys overlaying LCD 2306, or a combination thereof; one or more microphones, a subscriber identification module (SIM) card 2310; memory means 2312 which may comprise ROM, RAM, Flash, or any combination thereof; "WIFI" and/or "BLUETOOTH wireless interface(s) 2314; a wireless telephony interface 2316; power management circuitry 2318 with associated battery 2320; a "USB" interface 2322 and connector 2324; an audio management system 2326 with associated microphone 2328, speaker 2330 and headphone jack 2332; and various optional accessory features 2338 such as a digital camera, GPS, accelerometer, etc. As further noted, the smart device 2100 may itself be a smart device 100 or the smart device 2100 may include a control device 100' as described previously. Programming may be provided and stored in memory means 2312 to control the operation of smart device 2100 by way of operating system 2340 software such as for example iOS, Android, Linux, Web apps, etc., which operating software may support voice-enabled control as sell as the download and execution of various add-on apps 2342 as necessary for a particular purpose, all as well known in the art. As noted above, a setup agent software 2344 is also provisioned to smart device 2100 in order to facilitate detection, installation, and operation of manufacturer-supplied appliance interface apps, as will now be described in further detail. It is also to be understood that, while the illustrated smart device 2100 is particularly adapted to receive input via use of a keypad and/or touchpad display that is provided as an integral part of the smart device 2100, the smart device 2100, or other like smart devices such as the TV illustrated in FIG. 2B, can be provided input via use of further remote devices such as a remotely located mouse, pointer device, touch pad, or the like. These remotely located input devices would accordingly be adapted to communicate to an associated smart device data that is indicative of user interactions with such input devices to thereby achieve the same purposes described herein, e.g., to navigate and interact with a user interface.

Figure 20:
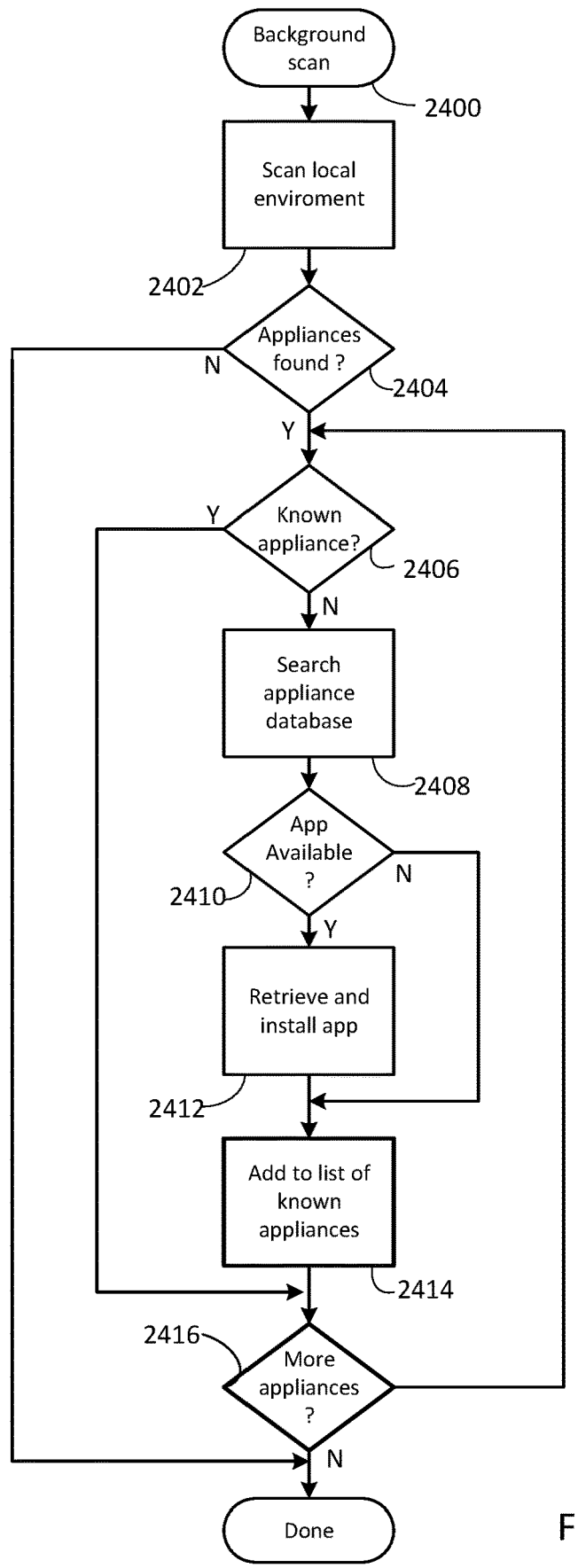
FIG. 20 illustrates an example series of steps carried out by a smart device setup agent upon detection of a network enabled appliance in its environment.

With reference now to the flowchart of FIG. 20, at step 2400 the setup agent 2344 may periodically initiate a scan 2402 of its current wired or wireless, network environment (e.g., "WIFI," "BLUETOOTH,", etc. or any combination thereof) in order to ascertain the presence of one or more networked appliances. This action may be initiated automatically (for example based on a timer which is used to measure predetermined periods of time, in response to the device being turned on, in response to a detected change in location of the smart device using for example its GPS or the like type of functionality, etc.), or when connecting to new networks, or may be manually initiated by a user of smart device 2100 (for example in response to an activation of a user input element, in response to the smart device 2100 being moved, etc.) as appropriate for a particular embodiment. If it is determined at step 2404 that no responsive appliances are present in the environment, the setup agent actions are complete. If, however, responsive devices are detected on the wireless network, e.g., a device responds with data indicative of its identity in response to a polling request message sent from the smart device 2100, then at step 2406 the setup agent may next determine, using the information received, if a responsive appliance is already known to the setup agent, e.g., determine if the appliance has already been detected during a previous detection operation or otherwise manually indicated to the smart device 2100. Such a determination may be made, for example, by consulting a setup agent-administered listing of appliance identities, maintained as will be described hereafter at step 2414. If the appliance is already known to the setup agent, processing continues at step 2416 to determine if further responsive appliances have been detected.

If it is determined that a newly-responsive appliance has been detected, then at steps 2408 and 2410 the setup agent may next determine if an app is available for that appliance. Such a determination may be made, for example, by using vendor information, a third party compatibility database, or by a social network database which may contain related appliance information updated by other users or by searching a database that functions to cross-reference appliance identifying data as would be received from the appliances (e.g., data indicative of a manufacturer and model number) to available apps and locations from which such apps may be download, such as appropriate "app stores." Such a database may be stored in local memory 2312 as part of the setup agent programming, may be located at a cloud-based data storage facility or server 2116, or a combination thereof, as appropriate for a particular embodiment. If no app is available, processing continues at step 2414, adding the instant appliance identity to the listing of known appliance identities. If it determined that an app is available, at step 2412 the appropriate app may be recommended to the user or may be downloaded to the smart device 2100 from a location indicated in the database entry, e.g., a location pointed to by use of a URL, IP address, etc. As will be appreciated, depending on the particular implementation such a download and install may be performed automatically by the setup agent, or the agent may first present the download possibility to the user of smart device 2100 for confirmation. As will also be appreciated, in those instances where the app download is sourced from a site which requires user sign-in and/or authentication, such as for example the "iTunes" brand store or "Android Marketplace" brand store, user credentials may be pre-loaded into the setup agent program to facilitate such automatic download, or may be requested from smart device user each time download is to be performed.

When an app is downloaded and installed, in some embodiments the setup agent may register that app with a cloud-based service, by way of forwarding unique identity information regarding the app and the environment (e.g., install device, network, and/or app owner information) in which it is operational to a server system such as for example the server 2116 of FIG. 17. Such registration information may be subsequently utilized for the purpose of synchronizing multiple instances of the same app across different devices and/or different platforms, as will be further described hereafter in conjunction with FIG. 21. Synchronization may include state synchronization as well as credential synchronization. Credential synchronization is intended to allow a user to use a newly installed app to access a service, such as media streaming service, the same as if the user were using a prior installed version of the same or similar app within the environment.

In some embodiments, the setup agent may, in conjunction with the installation of certain apps which require specific equipment configurations, also generate macro command sequences as necessary to place various appliances into the required state upon initiation of/use of the app. By way of illustration without limitation, a TV viewing or game show participation app may require that a TV 2102 to be set to a particular input and/or a cable set top box 2104 be tuned to a particular channel, etc., in which case a command sequence ("macro") may be created by the setup agent to be executed every time that app is initiated. As will be understood by those skilled in the art, a single GUI may display all of the app links and common macros across the devices and/or platforms. Since methods for control of entertainment appliances and/or use of macros are well known in the art, these will not be discussed further herein, however for additional information the interested reader may turn to for example U.S. Pat. No. 9,215,394, entitled "System and Method for Optimized Appliance Control," or U.S. Pat. No. 9,852,615, entitled "System and Method for Facilitating Appliance Control via a Smart Device," both of common ownership and both incorporated herein by reference in their entirety.

Next, at step 2414, the setup agent may add the current appliance identity into a local tabulation of known appliances. Such an identity may comprise a serial number, MAC address, or any other data value suitable to uniquely identify the appliance. The tabulation will also preferably include a listing of and information related to, as needed, apps installed on the appliance. Thereafter, at step 2416 the setup agent may ascertain if additional responsive appliances were detected and, if so, the process described above is repeated, until all responding appliances have been accounted for.

While not illustrated, in some embodiments, provision may also be made within the setup agent programming to allow a user to purge or edit entries in the tabulation of known appliances (and apps installed thereon as needed), for example when a smart device is permanently relocated to a different environment, etc. Removal of known appliance tabulation entries may also be performed automatically by the setup agent when a previously responsive appliance has failed to acknowledge several scan cycles; when an associated app is deleted by the user of the smart device; etc. The tabulation may be maintained locally and/or with a cloud-based service as desired. When maintained with a cloud-based service, it will be desired to keep the information in a manner that does not violate any privacy rights of the system user(s).

Figure 21:
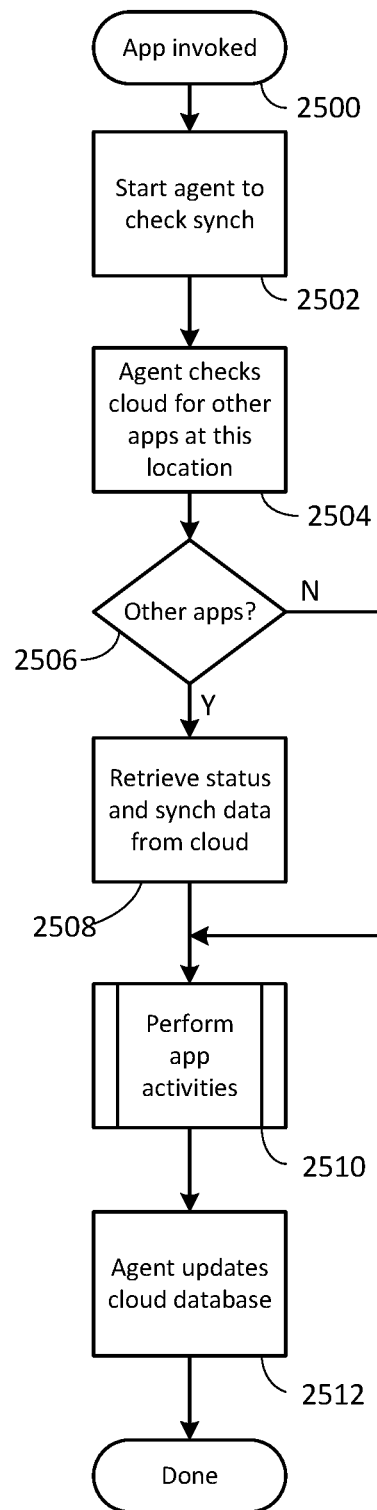
FIG. 21 illustrates an example series of steps carried out by a smart device setup agent to synchronize status and other data across multiple instances of an appliance interface app.

With reference now to the flowchart of FIG. 21, when an individual appliance associated app, for example such as the app illustrated in FIG. 2A, is invoked at step 2500, the app may initially invoke a setup agent (or cause a start of a setup process that is a part of the app itself) at step 2502 in order to effect synchronization of this app's appliance status values (and in some instances login credentials) with those of any other instances of the same app which may be present in the current environment and/or resident on other devices registered to the same owner. To achieve this, at step 2504 an example setup agent 2344 may access a cloud-based database service, located for example on server 2116, in order to determine if any other instances of this app are present in the current environment, have common ownership, and/or the like. To accomplish such a check, the setup app may provide a unique app identity and unique environment identity to the database service. As appropriate for a particular implementation, an app identity may comprise a label value assigned by the developer(s) of the app; a manufacturer and appliance model number; or any other data which may serve to uniquely identify the specific app. An environment identity may comprise a "WIFI" network name; access point address; one or more MAC addresses; a user id; etc; or any other data which may serve to uniquely identify the specific environment in which the app is currently active. The cloud-based service may compare the provided values against a database of installed app information in order to determine if other instances of the app are present in the local environment and/or to determine if a corresponding app might be newly available for use on any of smart devices within the local area network. If an app is newly available, the app can be provisioned to such devices and synchronized with existing apps within the network as described above.

At step 2506 it may be determined, based on the response from the database service, whether any other instances of this app are in fact registered at the current environment. If not, processing continues at step 2510 where control may be returned to the app for the performance of the function(s) for which it was invoked. If, however, it is determined that other instances of the instant app are present, then at step 2508 the most recently saved status of the app may be downloaded from the corresponding entry in the cloud database and used to pre-configure the current instance. Such status information may include, as required for a particular appliance and/or app, items such as control settings, progress indicators, reminders, timeouts, state switches, authentications, cookies, shopping cart contents, service information, error logs, etc., without limitation.

At step 2510 the function(s) for which the app was invoked may then be performed, after which at step 2512 updated app status data reflecting the new state of the app may be uploaded to the cloud database for storage and subsequent use by this or other instances of the app.

As described above, a voice platform enabled smart device 2100 can be used to discover an appliance and, after the appliance is discovered, a finger print for the appliance, e.g., manufacturer information, brand information, device type information, device model information, firmware version information, supported control interface information, information about a supported app running on the device, information about a supported app running on the smart device 2100 for use with the device, and/or the like information usable to uniquely identify an appliance, may be used to retrieve one or more apps (which apps may include or provide access to appropriate command data, formatting information, etc. as needed) for providing voice control capabilities to the system. Furthermore, it is contemplated that, in some instances, an appliance discovery process can be utilized as described above for the purpose of determining if an appliance supports control via a voice enabled platform, e.g., to determine if the appliance is an "ALEXA" cloud-based, voice serving platform compatible device and, in the event the smart device 2100 does not have the appropriate software for supporting that device already installed thereon, e.g., the "ALEXA" cloud-based, voice service platform software, the "SIRI" cloud-based, voice service platform supporting software, the "GOOGLE ASSISTANT" cloud-based, voice service platform software, the smart device 2100 may be caused to first install such software in memory whereupon execution of that software may be used to perform further device discovery for use in obtaining one or more apps (also known as a "skill," "Action," or the like as noted above) for use in connection with the voice service platform supporting software to thereby configure the smart device 2100 to communicate with that appliance. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

In a similar manner, a voice platform enabled smart device 2100 can be used to discover a service and, after the service is discovered, a finger print for the service, e.g., manufacturer information, brand information, information about an app associated with the service that is running on the appliance, and/or the like information usable to uniquely identify a service, may be used to retrieve one or more apps (which apps may include or provide access to appropriate command data, formatting information, etc. as needed) for providing voice control capabilities to the system. Furthermore, it is contemplated that, in some instances, a service discovery process can be utilized as described above for the purpose of determining if an appliance supports a service that is controllable via a voice enabled platform, e.g., to determine if the appliance supports an "ALEXA" cloud-based voice serving platform compatible service and, in the event the smart device 2100 does not have the appropriate software for supporting that service already installed thereon, e.g., the "ALEXA" cloud-based voice service platform software, the "SIRI" cloud-based voice service platform supporting software, the "GOOGLE ASSISTANT" cloud-based voice service platform software, the smart device 2100 may be caused to first install such software in memory whereupon execution of that software may be used to perform further service discovery for use in obtaining one or more apps (also known as a "skill," "Action," or the like as noted above) for use in connection with the voice service platform supporting software to thereby configure the smart device 2100 to communicate with that service. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

It is further contemplated that the system may listen for and/or solicit the user to speak keywords for this same purpose. In this regard, the keywords might not only include the above noted information usable to form a fingerprint for an appliance and/or a service but might also include keywords that are known to be recognizable by a specific cloud-based, voice service platform. For example, upon the user speaking a wake work specific to a given type of digital assistant, e.g., "Alexa," "Hey Google," Hey Siri," Hey Xfinity" or the like, the system may cause the operating software associated with that digital assistant to be provided to the smart device 2100 for installation (or may cause such operating software to be enabled if already resident of the smart device 2100) and, if needed or desired, the operating software for the voice enabled platform, once operating on the smart device 2100, can be used to perform further appliance and/or service detection processes for use in connection with configuring the smart device 2100 with apps usable to communicate with such appliance and/or services as described above.

For use in identifying the appropriate operating software and/or apps that are to be provisioned to the smart device 2100 as a part of these above-described processes, the system preferably maintains a database in which finger print information is cross-referenced to such operating software and/or apps. The database may be stored in memory of a local device and/or stored in memory associated with a cloud-based server device that is accessible via a wide-area-network. In this manner, information needed to locate and download the appropriate operating software and/or apps can be deduced by a device and used to retrieve such software and/or apps from its own memory and/or memory associated with still further services, e.g., from a database associated with a third party server. It is also contemplated that any such software and/or app providing service can track owner information, e.g., log-in information, privileges, appliance(s) registered to the user, etc., to limit the ability to access and download apps, to seamlessly integrate downloaded and installed apps into the system, etc. as described above. For example, a cloud service provided for the noted purposes may function to authenticate a user when they log into the service and thereafter, using device and/or service discovery information received from one or more devices on the user's system, establish an ownership mapping between the user, the smart device, and appliances/services that will be included in the user's "connected" environment.

As will be further understood by those of skill in the art, when using an app lookup API it is feasible for the voice assistant operating on the voice enabled platform of smart device 2100 to notify a user that a new skill to a matching appliance or service that was recently added to a network, e.g., a local area network, is available for installation. The availability of a new, matching skill can be indicated to the user on the device 2100, such as by having the device 2100 display a special illumination pattern via use of LEDs, via an audible a notification, or the like. A user can then ask the voice assistant to check what the notification is about, which will lead to a skill recommendation whereupon the user can voice an acknowledgement to permit installation of the skill. The installation of the skill can be performed via use of a cloud API call using input parameters such as the user identification, smart device 2100 ID, and skill ID. Alternatively, a user may also set a policy that any matched skills are allowed to be installed automatically in which case the smart device 2100 will skip the skill recommendation and invoke the skill installation API when a new, matching skill is discovered without further user intervention.

Figure 22:
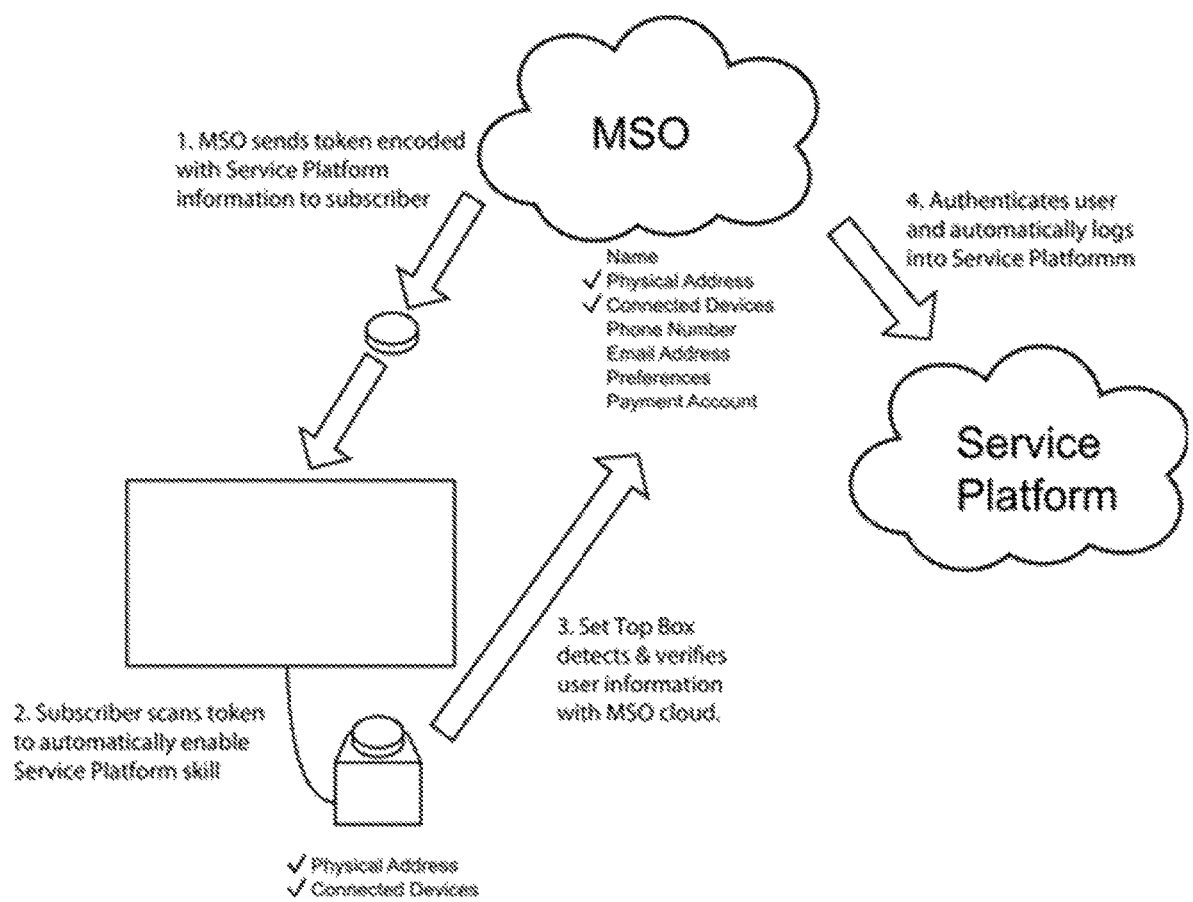
FIG. 22 illustrates an example series of steps for using a token to facilitate installation of an app in a voice-enabled smart device.

In a further example, illustrated in FIG. 22, an operator of such a cloud service can leverage the noted ownership mapping to further recommend skills and/or facilitate installation of skills within the system of the user. For example, a MSO (multi-service operator) may provide an optical or RF readable token that is encoded with information that functions to identify a particular skill while the MSO database contains the user information as noted, e.g., name, home address, phone number, equipment list, email address, payment information, tv viewing history and habits, information related to a services account, such as, email address or user id, user authentication information, usage history and preferences, and/or the like, etc. As will be appreciated, some or all of this information may also be stored in database associated with one or more third party service providers and this information can be leveraged by the MSO to send a personalized collection of tokens to its subscribers (for example electronically or via mail). Each token, in this example, would be provided with data that will be usable to automatically enable a corresponding skill/app for a particular voice enabled platform on the subscriber's smart device 2100, e.g., their set-top box.

By way of example, the tokens can provide data for use in installing a skill associated with a food delivery service, a ride sharing service, a review service, an e-commerce service, or the like. Upon receiving the token the user can scan, read, or otherwise obtain the data from the token—using the smart device or another device capable of forwarding such read data to the smart device—to automatically cause the associated skill to be installed on their smart device, in this example, their set-top box. Furthermore, because identifying information associated with the set-top box can be used to determine the user's home address, because the set-top box can be used to determine other connected appliances on the network of the user (as described above), and because some or all of this information can be verified to confirm the identity of the subscriber household, the system can be used to automatically log the user into an existing account with a service platform (or to create a new account with a service platform) to thereby allow such service to be quickly and easily integrated into the system. It is further contemplated that transactions between a subscriber and a service platform that would be performed via use of the voice enabled smart device, having the appropriate skill installed thereon, can then be monetized by the MSO per any agreement with the MSO and the service platform.

Figure 23:
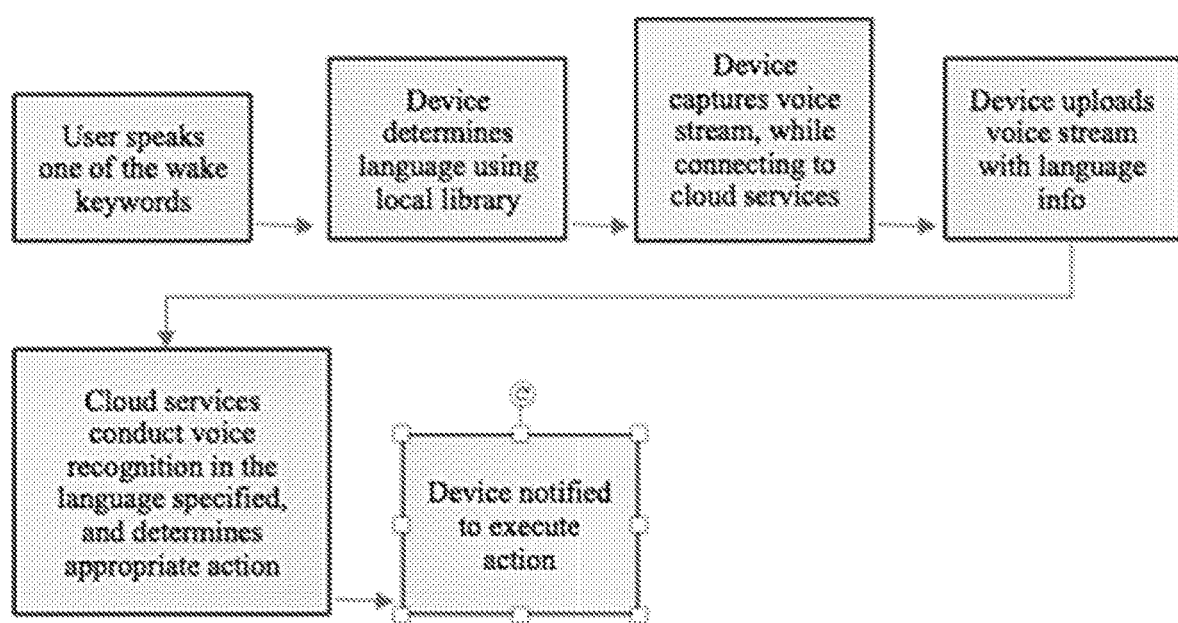
FIG. 23 illustrates an example series of steps for processing voice input in a native language of a user.

In some instance, as shown in FIG. 23, it will also be desirable for a voice enable system to be adapted to recognize specific keywords, such as wake words, spoken in different languages. The recognition of these keywords, e.g., the same wake word spoken in English, Spanish, or Chinese, is preferably conducted locally on the smart device 2100 without the need for any cloud services. Once a particular keyword is detected, the voice enable device may be caused to wake to thereby capture the following voice input whereupon the following voice input would be provided to a voice processing cloud service together with information that identifies the language in which the words were spoken for further processing. It will be understood that a benefit to the user is being able to interact with the system in his/her native language with the system responding quicker to the user's commands because the voice process service will not need to recognize/detect the language in the full voice stream received from the user.

Figure 24:
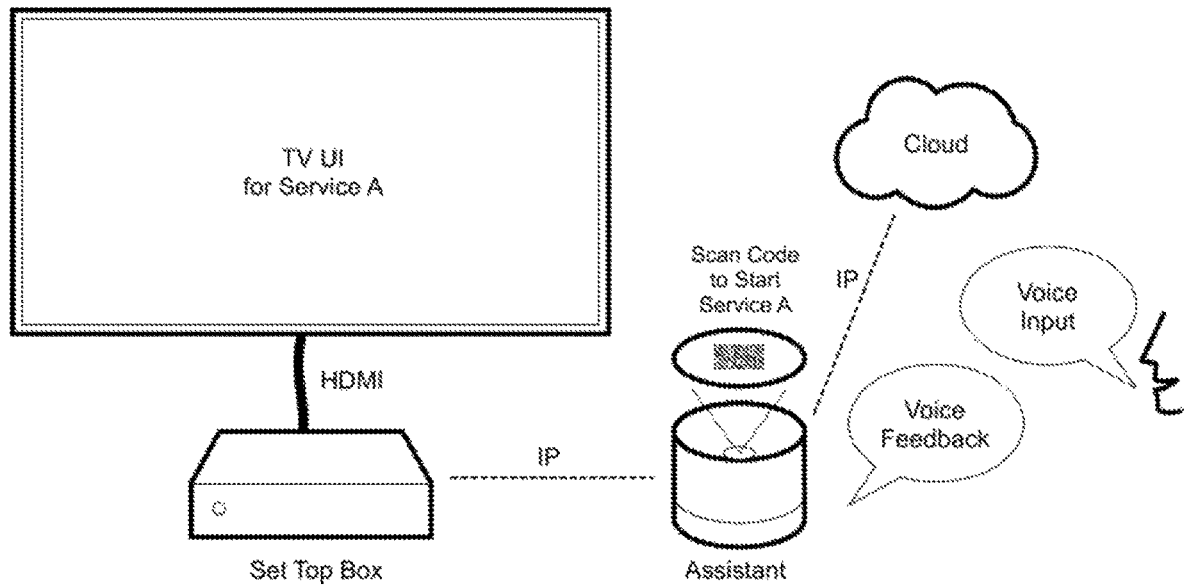
FIG. 24 illustrates an example system including a voice service enabled smart device.
Figure 25:
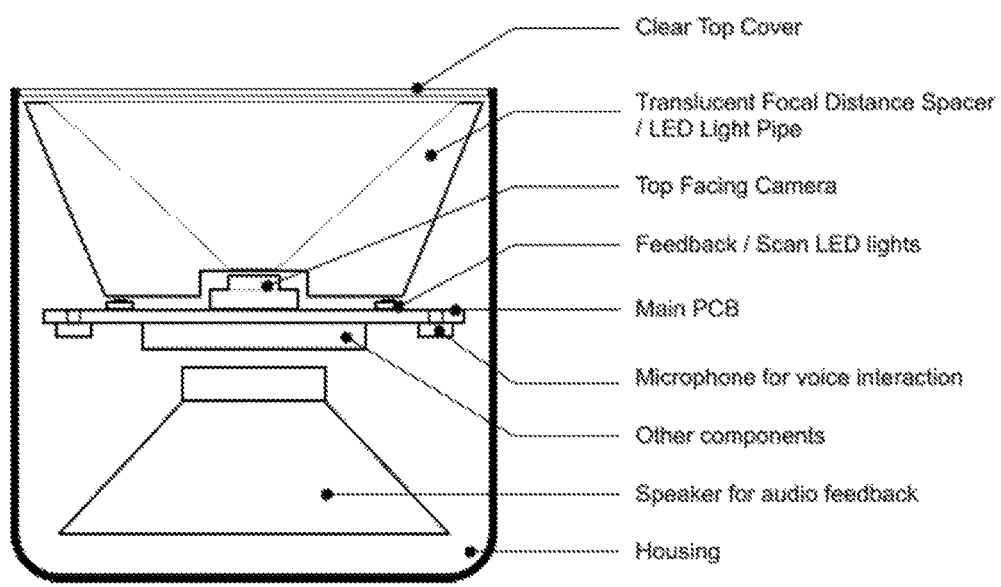
FIG. 25 illustrates example components of a voice service enabled smart device.

As further illustrated in FIGS. 24 and 25, in certain instances a voice enabled smart device may additionally include a camera in addition to devices that are meant to provide feedback to a user, such as a speaker, one or more LEDs, etc. Furthermore, when such a device is coupled to a media rendering device, such as a television, whether directly or via use of an intermediate device, such as a STB, the media rendering device is also usable as a means to provide feedback to a user (and to solicit input from the user, for example by providing a voice controlled graphical user interface). Thus, using the components of the example smart device as shown in FIG. 25 with the system shown in FIG. 24, a smart device can be used to scan, for example via use of an upwardly facing camera, ID barcodes, 2D QR codes or graphics, and even 3D objects. The scanning of such objects can then be used to initiate an interactive session with the user via use of the media rendering device. For example, by scanning a known object, e.g., a known QR code, that is linked to an interactive application, some or all of which may operate within the cloud, the interactive application can be invoked whereupon the interactive application will function to cause the smart device to generate a graphical user interface for display on the media rendering device and to cause the smart device to make active its microphone to receive commands from the user for interacting with the graphical user interface to perform some task, for example, to navigate to and to commence a viewing of/listening to a media.

As discussed above, a device, such as a TV, may use a setup application to discover other devices within the environment, such as a "ROKU" brand streamer device connected to the TV, as well as the apps, such as the "CNN" app, "ESPN" app, etc., installed on the discovered device. The apps installed on the other discovered devices are then capable of being installed on a further device within the environment, such as the TV upon which the setup application is operating in this example. In instances where the platform associated with the discovered apps is different than the platform being used by the device upon which the apps are to be installed, the cloud-service is able to cross-reference apps between differing platforms. In this manner, when a non "ROKU" platform device in a home, such as an "APPLE," "GOOGLE," or "FIRE" platform device, discovers a "ROKU" streamer device and the apps installed on that device, the cloud-service will be able to use the device fingerprint/device identifying information for the discovering device to determine its platform, use cross-referencing to find the apps for that platform that correspond to the discover "ROKU" platform apps, and cause the located apps to be installed on the discovering device. It will also be appreciated that the system can maintain a profile of the apps used in a home, for example in the cloud, and use that list to simplify installation of appropriate apps on a device newly introduced into an environment as described in U.S. Provisional Application No. 63/134,468 which application is incorporated herein by reference in its entirety.

Once an app is newly installed upon a device (whether the app is installed via use of the above described auto discovery and auto installation process or is otherwise installed—such as by a user—and then detected by the system as being "new" to the system), the system may function to automatically assist a user with logging into the app as needed. In this regard, it will be appreciated that various apps require a user to enter a user credential, such as a username and password combination, in order to use the services associated with the app, in whole or in part. In some circumstance, the credential that is required to be provided to access services associated with an app may be associated with a further service. For example, to access the services associated with a network media service provider, such as "ESPN," a user may need to provide a user credential that is associated with a cable television service provider, e.g., "COMCAST." In this manner, once the system verifies via use of the provided user credential that the user is a current "COMCAST" cable service subscriber and that user's current cable service subscription package includes "ESPN," the user will be allowed to access "ESPN" related services via use of the corresponding "ESPN" app installed on a device.

To automatically assist a user in using a newly installed app, such as an app auto installed on a device newly introduced into a system, the setup app or other device resident programming may function to generate a QR code representation of a deep link that is intended to be used to link the new app to an appropriate user credential, such as the aforementioned username and password combination, that should already be associated with a corresponding or same app that was prior installed on a device within the environment. For example, a user credential may be stored in connection with a password and/or tv provider credential saving function of a mobile device, such as found on an "IPHONE" brand phone, a password manager app, or the like. In this manner, the deep link can be shown on a display screen—for example upon the newly installed app being first invoked by a user, in response to the app being newly installed on a device, or the like—and, once the deep link is scanned using a mobile phone, the deep link can cause to the mobile phone to automatically jump the user to a webpage which basically provides a user interface for allowing the user to approve or request that the app as newly installed be connected to an appropriate user credential stored on or otherwise linked to by the mobile device.

In a further example, when there is an installed app on an existing device in the home network (particularly an app that is adapted to display targeted advertisements), the app can be used to generate a QR code when a user purchases a new device directly from the advertisement. The service that was used to authenticate the purchase may also be used to create a QR code once the purchase is completed. The QR code that is to be generated could be used to provide, for each app that can be supported on the newly purchased device and are part of the list of identified apps used in the home, the associated log in credentials. This QR code could be a single image or multiple images that contain the various log in credentials for each of the apps. Furthermore, while the purchasing app can be used to display the one or more created QR codes, it will be appreciated that a supplier can provide the one or more QR codes or codes with the new device when it is shipped by the supplier to the consumer. The purchasing user may then use the created/provided QR code(s) to automatically install the identified app(s) on the new device upon provisioning of the new device within the ecosystem of the user and the credentials would be automatically authenticated thereupon.

More particularly and by way of non-limiting example, a scan of the QR code will preferably provide the mobile phone with the information needed by a service provider to uniquely identify that their associated app has been newly installed on the device and the scanning phone can automatically provide the app install information and the account credentials to the service provider upon the webpage being accessed to facilitate use of the services associated with the newly installed app. In some circumstances, a user may need to verify the credentials to the service provider via use of the webpage. Once the service provider receives the required information, the service provider will be able to recognize the app when invoked on the device, will be able to verify that the user is credentialed to use the app to access services provided by the service provider, in whole or in part, and allow the user to access such services.

In the context of the above description, it is to be understood that deep linking is the use of a hyperlink that links to a specific, generally searchable or indexed, piece of web content on a website (e.g. "http://example.com/path/page") rather than the website's home page (e.g., "http://example.com"). The URL is intended to contain all the information needed to point to a particular item. If appropriate, deep linking can also refer to directly linking to in-app content using a non-HTTP URL.

In a further approach, use of an app installed on a new device may be facilitated via use of communications exchanged through a local network. For example, in response to a detection of a newly installed app, in response to an app being auto installed, in response to a newly installed app being first used, etc., such a "NETFLIX" app newly installed on a "SAMSUNG" brand TV newly introduced into the environment, the TV (or another device within the system as appropriate) can use an IP protocol extension to retrieve appropriate user authentication information from another device in the environment known to have the same or the similar app installed thereon. As noted above, a setup application in the system, a cloud-based service, etc. will have a record of which device or devices on the local area network have the app installed thereon (and accordingly have the necessary app credential information) because such information will have been collected by a setup application during a device and app discovery processes. Once the appropriate credential information is retrieved from another device in this manner, the credential information is preferably caused to be associated with the newly installed app, e.g., the retrieved credential information is stored on a device for provision to a service provider as needed, is stored at a service provider server in connection with app identifying information, etc. In this manner, the newly installed app will be useable to access services associated with the app, in whole or in part.

Figure 26:
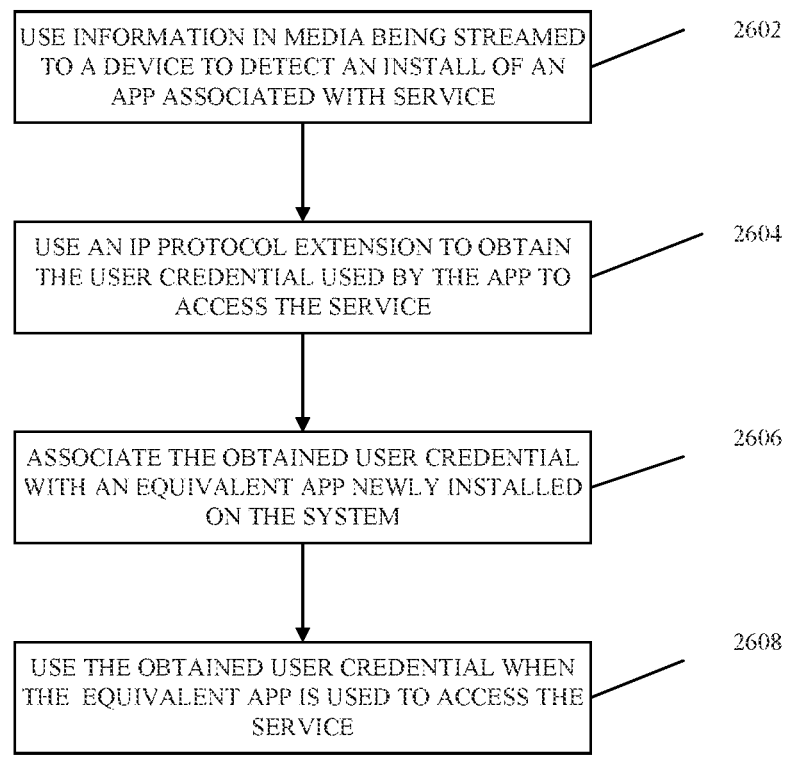
FIG. 26 illustrates an example method for associating a user credential for accessing a service with a newly installed app.

In keeping with the above example and as generally illustrated in FIG. 26, a media casting service, such as "CHROMECAST," can be used to provide user credential synchronization. To this end, during a casting of media from one device to another device having an app newly installed thereon within an environment, an app or other programming installed on the device that is receiving the cast media can be used to detect that another instance of the same or similar app is running on a different device 2602. Such discovery can be accomplished via use of ACR (Automatic content recognition) where an app or programming installed on the device receiving the cast media, such as a TV, is used to monitor what the user is watching (image recognition). An app or programming installed on the device receiving the cast media can also use OCR (Optical content recognition) to detect a logo, such as the "NETFLIX" logo, appearing within the media that is being received by the receiving device. By use of such recognition technology, the system can recognize that another instance of an app installed on a device is being used in the environment and can make this recognition without having to perform a device/app discovery operation, e.g., need not use a controlling device setup app as described herein. The system can then use the above-noted IP protocol extension, a cloud-based service, or the like—as needed—to obtain the user credential 2604 that is already being used within the system to access the service from which media is being cast whereupon the user credentials can be associated with the newly installed app 2606 and used with the app 2608 as discussed above.

It will also be appreciated that, if the devices share a common platform and the platform allows for synchronization between devices, a device, such as a smart phone, having already stored thereon the credentials needed to access a service via use of an associated app can cause such credentials to be passed to another device during a synchronization process to thereby allow for the use of a corresponding app newly installed upon a new device within the environment. In cases where a common platform is not present, a password saving app may be advantageously used for this purpose. For example, a password manager app can be used to synch and import all of the passwords for the installed apps on a mobile phone and the mobile phone may then pass the information to a setup enabled device, such as a smart TV, for use as described herein.

In a still further approach, the service provider itself can be used to ensure that an app newly installed on a device newly introduced into an environment is usable. To this end, the service provider can be informed and/or detect that a new instance of their app has been installed on a new device within an environment. For example, the service provider may be notified of the new instance of the app and information related to the device/home network on which the app is installed upon the app be activated by a user, e.g., the app will provide app and network fingerprint information to the service provider. In other example, the service provider may know of the downloading of a new instance of app within a home environment either because the app was downloaded directly from the service provider or from an "app store" that notified the service provider of such download. Using the information, the service provider can respond to a detected new instance of their app running on a new device within the environment by automatically linking a user credential already used in the same home to access the services provided via the app to this new instance. There are numerous ways for the service provider system to automatically detect that a new install of an app is within an environment in which the same app was previously installed and used, such as determining if an app is associated with an already known public network IP address, an already known device hardware signature, etc. In some instances, an app imported responsible for installing other apps within the system, whether recommended apps, detected apps, etc., can notify a service provider that an instance of their app has been installed on a device within the home with the notice having information as would be needed by the service provider to link a user credential to that app whereupon the app will be automatically rendered usable.

It is to be appreciated that one or more of the approaches described above can be utilized to auto-enable an app for use as needed or desired.

While various concepts have been described in detail, it will be appreciated by those skilled in the art that various modifications and alternatives to those concepts could be developed in light of the overall teachings of the disclosure. For example, in an alternate embodiment of control device functionality, in place of a preferred command matrix such as illustrated in FIG. 7, the programming of an example device may utilize a command prioritization list, for example a prioritization list "IP, CEC, IR" may cause the device programming to first determine if the requested command can be issued using Internet Protocol, only if not, then determine if the requested command can be issued using a CEC command over the "HDMI" interface, and only if not, then attempt to issue the requested command via an infrared signal. Such a prioritization reflects an example preference of using bi-directional communication protocols over uni-directional communication protocols over line of sight communication protocols, e.g., IR, when supported by the intended target appliance. Furthermore, while the examples above may describe a setup agent resident in a smart device, such as a phone or tablet, it will be appreciated that the teachings herein may be equally applicable to other app-capable device such as for example without limitation "smart" TVs, cable or satellite set top boxes, streaming video devices, home automation systems, and the like. Still further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method, comprising:
    receiving from an appliance within a home network which includes a smart device a data that identifies a first app installed on the appliance;
    using the received data that identifies the first app installed on the appliance to cause a second app to be automatically installed on the smart device; and
    using the received data that identifies the first app installed on the appliance and an identifier for the home network to automatically cause a user credential for a service that is associated with the first app installed on the appliance to be automatically associated with the second app installed on the smart device whereupon the user credential will be verifiable by the service upon a subsequent usage of the second app installed on the smart device.

2. The method as recited in claim 1, wherein the service comprises a media streaming service.

3. The method as recited in claim 2, wherein the user credential comprises a username and password combination associated with a cable service provider.

4. The method as recited in claim 2, wherein the user credential comprises a username and password combination associated with the media service provider.

5. The method as recited in claim 2, further comprising storing in a memory of a server device associated with the service a correspondence between the user credential and second app installed on the smart device.

6. The method as recited in claim 2, further comprising storing in a memory of the smart device the user credential and a correspondence between the user credential and the second app installed on the smart device.

7. A method, comprising:
    detecting by a smart device, via use of a media data received from an appliance within a home network which includes the smart device, a presence of a first app installed on the appliance;
    using by the smart device an IP protocol extension to automatically retrieve from the appliance a user credential that is associated with the first app installed on the appliance; and
    causing the user credential for a service that is associated with the first app installed on the appliance to be automatically associated with a second app installed on the smart device whereupon the user credential will be verifiable by the service upon a subsequent usage of the second app installed on the smart device.

8. The method as recited in claim 7, wherein the smart device uses automatic content recognition to detect the presence of the first app installed on the appliance.

9. The method as recited in claim 7, wherein the smart device uses optical content recognition to detect the presence of the first app installed on the appliance.

10. The method as recited in claim 7, wherein the service comprises a media streaming service.

11. The method as recited in claim 10, wherein the user credential comprises a username and password combination associated with a cable service provider.

12. The method as recited in claim 10, wherein the user credential comprises a username and password combination associated with a media streaming service provider.

13. The method as recited in claim 7, wherein the user credential is retrieved from a password manager service associated with the appliance.

14. The method as recited in claim 13, wherein the appliance comprises a smart phone.

15. The method as recited in claim 13, wherein the appliance comprises a tablet computer device.

16. A smart device, comprising:
    a processing device programmed to detect, via use of a media data received from an appliance within a home network which includes the smart device, a presence of a first app installed on the appliance; use an IP protocol extension to automatically retrieve from the appliance a user credential that is associated with the first app installed on the appliance; and
    cause the user credential for a service that is associated with the first app installed on the appliance to be automatically associated with a second app installed on the smart device whereupon the user credential will be verifiable by the service upon a subsequent usage of the second app installed on the smart device.

17. The smart device as recited in claim 16, wherein the smart device is further programmed to use automatic content recognition to detect the presence of the counterpart to the app installed on the appliance.

18. The smart device as recited in claim 16, wherein the smart device if further programmed to use optical content recognition to detect the presence of the counterpart to the app installed on the appliance.

19. The smart device as recited in claim 16, wherein the service comprises a media streaming service.

\* \* \* \* \*